(12) United States Patent
Ono et al.

(10) Patent No.: US 12,183,308 B2
(45) Date of Patent: Dec. 31, 2024

(54) DISPLAY CONTROL DEVICE AND DISPLAY CONTROL SYSTEM

(71) Applicant: Panasonic Intellectual Property Management Co., Ltd., Osaka (JP)

(72) Inventors: Kojiro Ono, Kanagawa Ken (JP); Masahito Oishi, Kanagawa Ken (JP); Kazunori Tanaka, Kanagawa Ken (JP); Tadahiro Uchikoshi, Kanagawa Ken (JP); Seiya Suda, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 185 days.

(21) Appl. No.: 17/948,714

(22) Filed: Sep. 20, 2022

(65) Prior Publication Data
US 2023/0021380 A1    Jan. 26, 2023

Related U.S. Application Data

(63) Continuation of application No. PCT/JP2021/010924, filed on Mar. 17, 2021.

(30) Foreign Application Priority Data

Mar. 27, 2020  (JP) .................................. 2020-059011

(51) Int. Cl.
G09G 5/36       (2006.01)
B60R 11/02      (2006.01)

(52) U.S. Cl.
CPC ................ G09G 5/36 (2013.01); B60R 11/02 (2013.01); *B60R 2300/207* (2013.01)

(58) Field of Classification Search
None
See application file for complete search history.

(56) References Cited

U.S. PATENT DOCUMENTS 10,534,736 B1 *  1/2020  Reghunath ............. G09G 5/363
2003/0036843 A1  2/2003  Okude et al.
(Continued)

FOREIGN PATENT DOCUMENTS

JP    2003-036174    2/2003
JP    2007-147928    6/2007
(Continued)

OTHER PUBLICATIONS

Joe, Hyunwoo, et al. "Dual display of virtual machines for automotive infotainment systems." 2015 IEEE 4th Global Conference on Consumer Electronics (GCCE). IEEE, 2015.*
(Continued)

*Primary Examiner* — Ryan M Gray
(74) *Attorney, Agent, or Firm* — Greenblum & Bernstien, P.L.C.

(57) ABSTRACT

A display control device includes a hardware processor. The hardware processor implements functions of a first operating system, a second operating system, and a hypervisor. The first operating system controls execution of at least one of a first application and a second application. The first application serves to generate a first content image to be displayed on a first display device mounted on a vehicle. The second application serves to generate a second content image to be displayed on a second display device mounted on the vehicle. The second operating system is different from the first operating system. The hypervisor controls execution of the first operating system and the second operating system.

23 Claims, 14 Drawing Sheets

(56) References Cited

U.S. PATENT DOCUMENTS

| | | | |
|---|---|---|---|
| 2014/0118222 A1 | 5/2014 | Barrett et al. | |
| 2015/0015479 A1 | 1/2015 | Cho | |
| 2016/0232872 A1* | 8/2016 | Yoo | G06F 9/452 |
| 2017/0358278 A1* | 12/2017 | Lee | G09G 5/001 |
| 2018/0004213 A1 | 1/2018 | Absmeier et al. | |
| 2018/0099678 A1 | 4/2018 | Absmeier et al. | |
| 2018/0222321 A1* | 8/2018 | Payne | G06F 3/04883 |
| 2018/0301095 A1* | 10/2018 | Runyan | G09G 5/38 |
| 2019/0042066 A1 | 2/2019 | Kim et al. | |
| 2020/0019431 A1* | 1/2020 | Kim | G06F 3/1454 |
| 2021/0263755 A1* | 8/2021 | Tian | G06F 9/455 |
| 2022/0055637 A1* | 2/2022 | Katayama | G06F 21/55 |

FOREIGN PATENT DOCUMENTS

| | | |
|---|---|---|
| JP | 2015-152992 | 8/2015 |
| JP | 2017-111251 | 6/2017 |
| JP | 2018-008688 | 1/2018 |

OTHER PUBLICATIONS

Milan, Z., et al. "Proposal for graphics sharing in a mixed criticality automotive digital cockpit." 2020 IEEE International Conference on Consumer Electronics (ICCE). IEEE, 2020.*

Mouzakitis, Angelos, et al. "A Safe Graphics Rendering Solution for Consolidated Operating Systems."*

Lucas, Pierre, et al. "Vosysmonitor, a trustzone-based hypervisor for iso 26262 mixed-critical system." 2018 23rd Conference of Open Innovations Association (FRUCT). IEEE, 2018.*

International Search Report (ISR) from International Searching Authority (Japan Patent Office) in International Pat. Appl. No. PCT/JP2021/010924, dated Jun. 8, 2021, together with an English language translation.

Office Action from Japan Patent Office (JPO) in Japanese Patent Appl. No. 2020-059011, dated Apr. 23, 2024, together with an English language translation.

* cited by examiner

DISPLAY CONTROL DEVICE AND DISPLAY CONTROL SYSTEM

CROSS-REFERENCE TO RELATED APPLICATIONS

This application is a continuation of International Application No. PCT/JP2021/010924, filed on Mar. 17, 2021 which claims the benefit of priority of the prior Japanese Patent Application No. 2020-059011, filed on Mar. 27, 2020, the entire contents of which are incorporated herein by reference.

FIELD

The present disclosure relates generally to a display control device and a display control system.

BACKGROUND

In the related art, there is a known technique for displaying content such as an image transmitted from one source device on a plurality of display devices. In such a technique, plural users can view the content by using different display devices (for example, Japanese Patent Application Laid-open No. 2015-152992 and Japanese Patent Application Laid-open No. 2007-147928)

SUMMARY

A display control device according to the present disclosure includes a hardware processor configured to implement functions of a first operating system, a second operating system, and a hypervisor. The first operating system controls execution of at least one of a first application and a second application. The first application serves to generate a first content image to be displayed on a first display device mounted on a vehicle. The second application serves to generate a second content image to be displayed on a second display device mounted on the vehicle. The second operating system is different from the first operating system. The hypervisor controls execution of the first operating system and the second operating system.

DETAILED DESCRIPTION

The following describes embodiments of a display control device and a display control system according to the present disclosure with reference to the drawings.

First Embodiment

Figure 1:
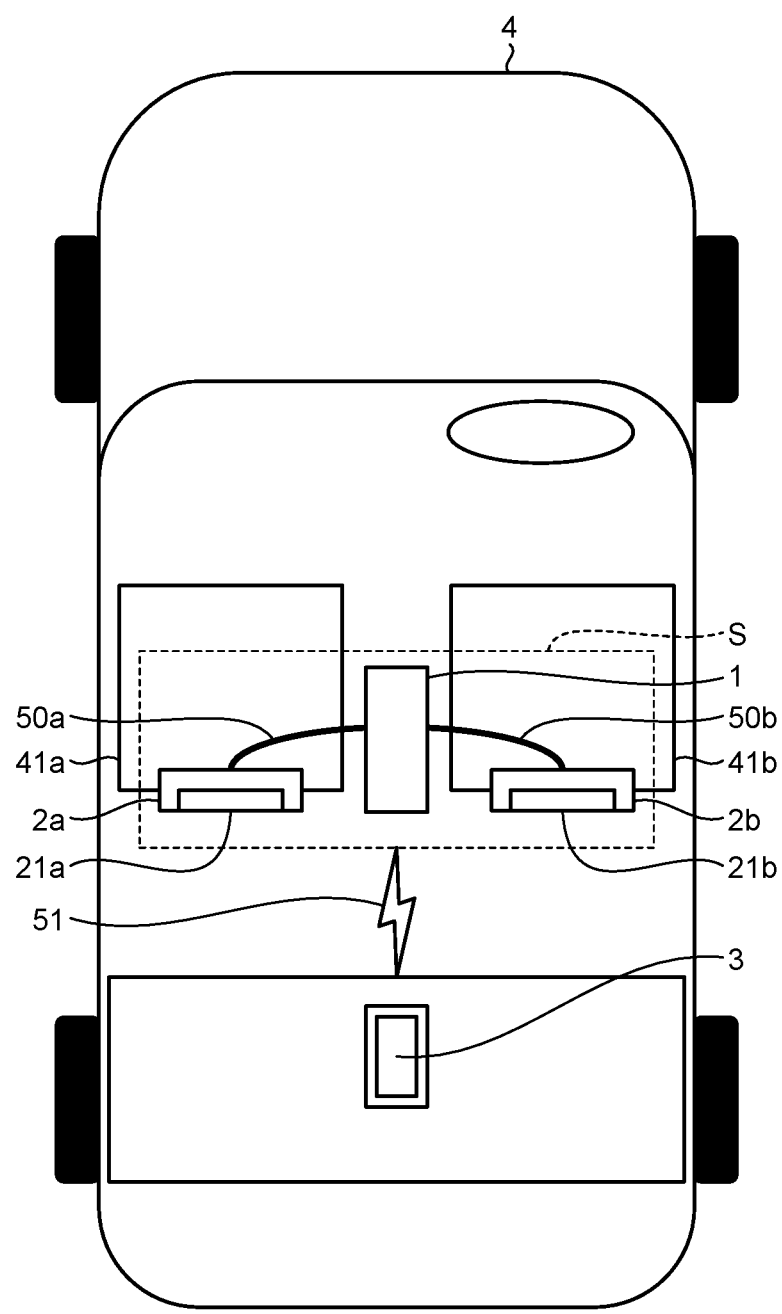
FIG. 1 is a diagram illustrating an example of a vehicle on which a display control system according to a first embodiment is mounted.

FIG. 1 is a diagram illustrating an example of a vehicle 4 on which a display control system S according to the present embodiment is mounted. As illustrated in FIG. 1, the display control system S according to the present embodiment includes a display control device 1, a first display device 2*a*, and a second display device 2*b*.

The first display device 2*a* and the second display device 2*b* according to the present embodiment are rear seat monitors that are respectively disposed on a seat back of a passenger seat 41*a* and a seat back of a driver's seat 41*b* of the vehicle 4. The first display device 2*a* is disposed at a position that is visible to a user seated on a rear seat of the vehicle 4. The second display device 2*b* is disposed at a position that is visible to another user seated on the rear seat of the vehicle 4. The user who uses the first display device 2*a* is also referred to as a first user, and the user who uses the second display device 2*b* is also referred to as a second user.

Each of the first display device 2*a* and the second display device 2*b* is assumed to include a touch screen that can be operated with a finger or a touch pen (stylus pen). The touch screen includes a display and a touch panel. In the present embodiment, the touch screen included in the first display device 2*a* is referred to as a first touch screen 21*a*, and the touch screen included in the second display device 2*b* is referred to as a second touch screen 21*b*. Hereinafter, in a case where the first display device 2*a* and the second display device 2*b* are not particularly distinguished from each other, they are each referred to as a display device 2. In a case where the first touch screen 21*a* and the second touch screen 21*b* are not particularly distinguished from each other, they are each referred to as a touch screen 21.

The display control device 1 is a computer configured to control the first display device 2*a* and the second display device 2*b*, and cause the first display device 2*a* and the second display device 2*b* to display an image. The display control device 1 is connected to the first display device 2*a* and the second display device 2*b* by a wired network via cables 50a and 50b. For information communication between the display control device 1 and each of the first display device 2a and the second display device 2b, for example, a scheme such as IEEEBUS or Gigabit Video Interface (GVIF) is assumed to be used. The display control device 1 is connected to an information terminal 3 via a wireless network 51 such as Wi-Fi (registered trademark).

The first display device 2a and the second display device 2b each display image data received from the information terminal 3 according to the present embodiment. In the present embodiment, the display control device 1 displays an image displayed on a display of the information terminal 3, on the touch screen 21 of each of the first display device 2a and the second display device 2b by using a mirroring technique such as Miracast (registered trademark).

In the present embodiment, an image that is caused to be displayed on each of the first display device 2a and the second display device 2b by the display control device 1 is referred to as a content image. The content image is some kind of image content, and may be a static image or a moving image. The content image may also include voice in addition to a moving image or a static image. The content image displayed on the first touch screen 21a of the first display device 2a is referred to as a first content image. The content image displayed on the second touch screen 21b of the second display device 2b is referred to as a second content image. In a case where they are not distinguished from each other, they are each simply referred to as a content image. The present embodiment employs the mirroring technique described above, so that the first content image and the second content image are assumed to be the same image.

In a case where an operation of bringing a finger or an object into contact with a display image displayed by mirroring is performed on the touch screen 21 of each of the first display device 2a and the second display device 2b, the display control device 1 feeds back, to the information terminal 3, coordinate information indicating a position with which the finger or the object is brought into contact on the content image. Such feedback is performed by, for example, a technique of User Input Back Channel (UIBC). In a case where feedback of the coordinate information is received from the display control device 1, the information terminal 3 performs the same operation as that in a case where the finger or the object is brought into contact with a position corresponding to the coordinate information on the display of the information terminal 3. Due to this, the user can operate the information terminal 3 by operating the touch screen 21 of the first display device 2a or the second display device 2b.

In the embodiment, the operation of bringing the finger or the object into contact with the touch screen is referred to as a touch operation. The position with which the finger or the object is brought into contact on the touch screen, that is, the position where the touch operation is performed is referred to as a touch position.

The information terminal 3 is, for example, a smartphone, but may be any device conforming to a mirroring standard such as Miracast (registered trademark). The information terminal 3 may be a tablet terminal or a laptop PC.

The display control system S according to the present embodiment provides entertainment such as a moving image distributed from the information terminal 3 to an occupant seated on the rear seat, so that the display control system S is also referred to as a Rear Seat Entertainment (RSE) system. The information terminal 3 is a distribution source of an image, so that the information terminal 3 is also referred to as a source device. The first display device 2a and the second display device 2b each display an image distributed from the source device, so that they are also each referred to as a sink device.

Figure 2:
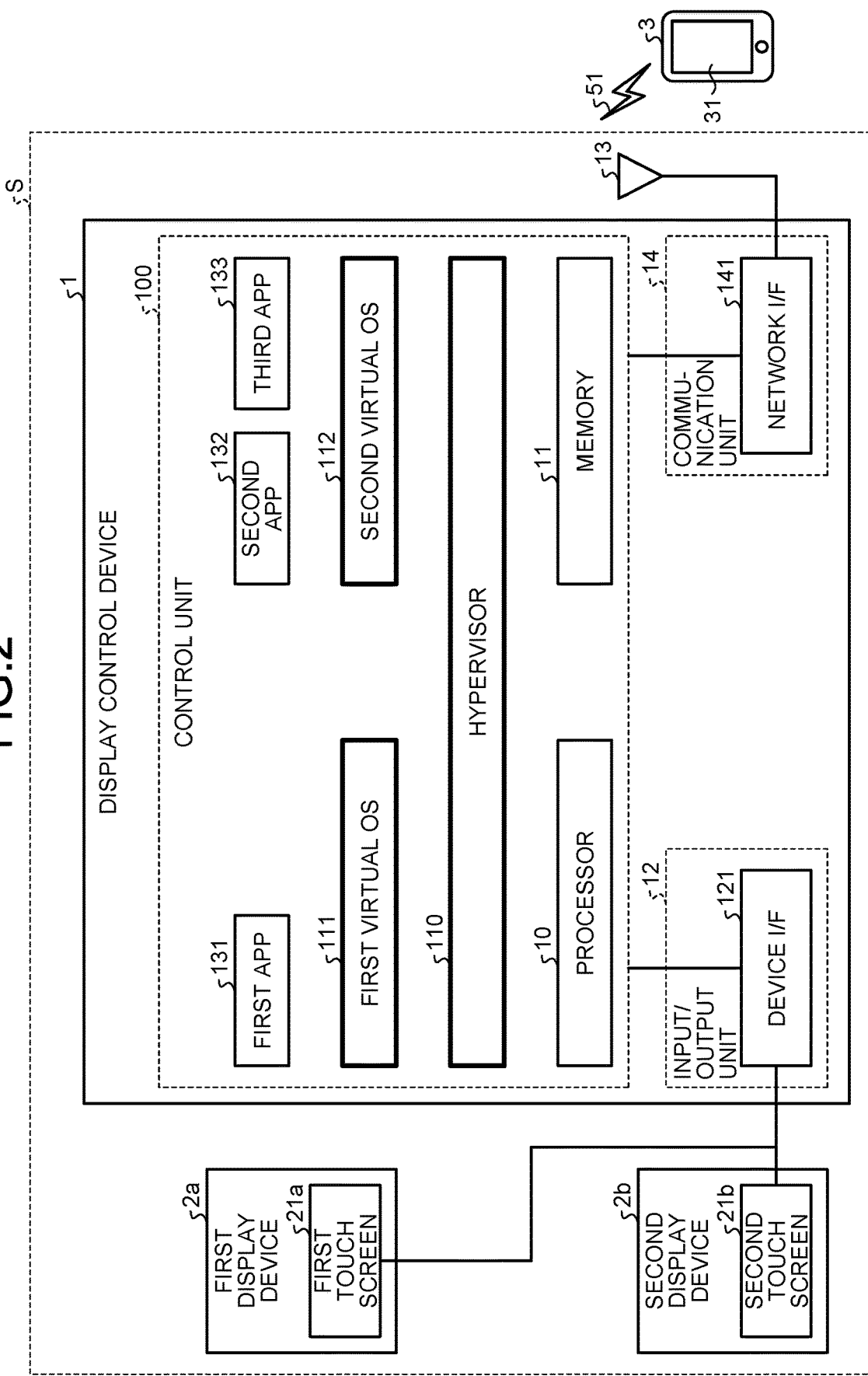
FIG. 2 is a diagram illustrating an example of a configuration of the display control system according to the first embodiment.

FIG. 2 is a diagram illustrating an example of a configuration of the display control system S according to the present embodiment. As illustrated in FIG. 2, the display control device 1 includes a processor 10, a memory 11, an input/output unit 12, a communication unit 14, and a communication antenna 13.

The communication antenna 13 transmits/receives information to/from the information terminal 3 via the wireless network 51.

The communication unit 14 includes a network interface (I/F: Inter/Face) 141 for performing network communication with the information terminal 3. In the present embodiment, the communication unit 14 receives, from the information terminal 3, image information indicating a content image displayed on a display 31 of the information terminal 3 via the communication antenna 13. Herein, for example, the image information is a content image that is compressed conforming to an information communication standard of mirroring, but is not limited thereto.

The communication unit 14 also transmits information processed by the processor 10 to the communication antenna 13. In the present embodiment, the communication unit 14 transmits touch coordinates indicating the touch position on the first touch screen 21a or the second touch screen 21b associated with information for identifying the touch screen on which the touch operation is performed from the processor 10 to the information terminal 3 via the communication antenna 13. Details about the touch coordinates will be described later.

The input/output unit 12 includes a device interface (I/F) 121 for transmitting/receiving information to/from the first display device 2a or the second display device 2b. Specifically, the input/output unit 12 transmits, to the first display device 2a, image information indicating a content image output from the processor 10, image information indicating a shadow image (described later), a display position of the shadow image, and the like.

The input/output unit 12 also acquires touch coordinates on the first touch screen 21a of the first display device 2a from the first display device 2a, and transmits the touch coordinates to the processor 10. The input/output unit 12 also transmits, to the second display device 2b, image information indicating the content image output from the processor 10, image information indicating the shadow image (described later), the display position of the shadow image, and the like.

The input/output unit 12 also acquires touch coordinates on the second touch screen 21b of the second display device 2b from the second display device 2b.

The device interface 121 is, for example, an integrated circuit (IC) that transmits/receives information conforming to the IEEEBUS standard, but is not limited thereto. Alternatively, the processor 10 may transmit/receive information to/from the first display device 2a or the second display device 2b without using the input/output unit 12.

The processor 10 includes processing circuitry such as one or more central processing units (CPUs) or one or more graphics processing units (GPUs), for example. The processor 10 controls the entire display control device 1. For example, as illustrated in FIG. 2, the processor 10 implements functions of a hypervisor 110, a first virtual OS (Operating System) 111, a second virtual OS 112, a first application 131, a second application 132, and a third application 133 by reading out and executing various computer programs stored in the memory 11. At least one of the hypervisor 110, the first virtual OS 111, the second virtual OS 112, the first application 131, the second application 132, and the third application 133 may be stored in the memory 11 in advance. In the present specification, the word "application" may be described as "app" hereinafter.

In the present embodiment, the processor 10 and the memory 11 are collectively referred to as a control unit 100. The control unit 100 may include the hypervisor 110, the first virtual OS 111, the second virtual OS 112, the first app 131, the second app 132, and the third app 133 that are implemented by the processor 10 and the memory 11.

The hypervisor 110 is executed on the processor 10, and controls execution of the first virtual OS 111 and the second virtual OS 112. A form of the hypervisor 110 applied to the present embodiment is not particularly limited.

The first virtual OS 111 controls execution of at least one of the first app 131 and the second app 132. In the present embodiment, the first virtual OS 111 controls the first app 131. The first virtual OS 111 is an example of a first operating system according to the present disclosure.

The second virtual OS 112 is an operating system different from the first virtual OS 111, and controls at least execution of the third app 133. In the present embodiment, the second virtual OS 112 controls execution of the second app 132 and the third app 133. The second virtual OS 112 is an example of a second operating system according to the present disclosure. A virtual OS such as the first virtual OS 111 and the second virtual OS 112 is also referred to as a guest OS.

Types of the first virtual OS 111 and the second virtual OS 112 are not particularly limited. For example, each of the first virtual OS 111 and the second virtual OS 112 may be a Real-time operating system (RTOS), a dedicated vehicle-mounted operating system such as an embedded operating system, for example, or a general-purpose operating system such as Linux (registered trademark). Each of the first virtual OS 111 and the second virtual OS 112 may also be a software platform (SPF) of AUTOSAR (registered trademark).

The first app 131 is application software operating on the first virtual OS 111. Each of the second app 132 and the third app 133 is application software operating on the second virtual OS 112.

In the present embodiment, it is assumed that the first virtual OS 111 controls the first display device 2a, and the second virtual OS 112 controls the second display device 2b. However, the present disclosure is not limited to such examples. For example, the first app 131 may be configured to control the first display device 2a. Additionally, the second app 132 may be configured to control the second display device 2b.

In a case where image information is transmitted from the information terminal 3 present in the vehicle 4, the first app 131 generates a first content image on the basis of the transmitted image information. The first virtual OS 111 then causes the first touch screen 21a of the first display device 2a mounted on the vehicle 4 to display the generated first content image. In a case where the user performs the touch operation on the second touch screen 21b, the first app 131 generates a shadow image. The first virtual OS 111 then causes the first touch screen 21a to display the shadow image.

Herein, the shadow image is an image indicating that the touch operation is performed in a range in which a display image is displayed on another touch screen. Details about the shadow image will be described later. The shadow image is an example of an index image according to the present disclosure.

In a case where image information is transmitted from the information terminal 3 present in the vehicle 4, the second app 132 generates a second content image on the basis of the transmitted image information. The second virtual OS 112 then causes the second touch screen 21b of the second display device 2b mounted on the vehicle 4 to display the generated second content image. In a case where the user performs the touch operation on the first touch screen 21a, the second app 132 generates a shadow image. The second virtual OS 112 then causes the second touch screen 21b to display the shadow image.

The image information indicating the first content image is an example of first image information, and the image information indicating the second content image is an example of second image information. In the present embodiment, the image information transmitted from the information terminal 3 serves as both of the first image information and the second image information. In a case where the first display device 2a and the second display device 2b respectively display different content images, the first image information and the second image information respectively indicate different content images.

The third app 133 is not executed in a case where the first app 131 described above is normally operating, whereas it is executed in a case where processing of the first app 131 is stopped due to a failure or the like.

The third app 133 has at least part of the functions of the first app 131 described above. For example, in a case where the image information is transmitted from the information terminal 3 present in the vehicle 4, the third app 133 generates a first content image on the basis of the transmitted image information. In this case, the second virtual OS 112 may cause the generated first content image to be displayed on the first touch screen 21a of the first display device 2a mounted on the vehicle 4. In a case where the user performs the touch operation on the second touch screen 21b, the third app 133 may generate the shadow image. In this case, the second virtual OS 112 may cause the shadow image to be displayed on the first touch screen 21a. The third app 133 may have the same functions as the first app 131.

The memory 11 is a storage device that stores a computer program executed by the processor 10, and various kinds of data required for performing processing. The memory 11 is, for example, a ROM, a RAM, a flash memory, and the like.

Figure 3:
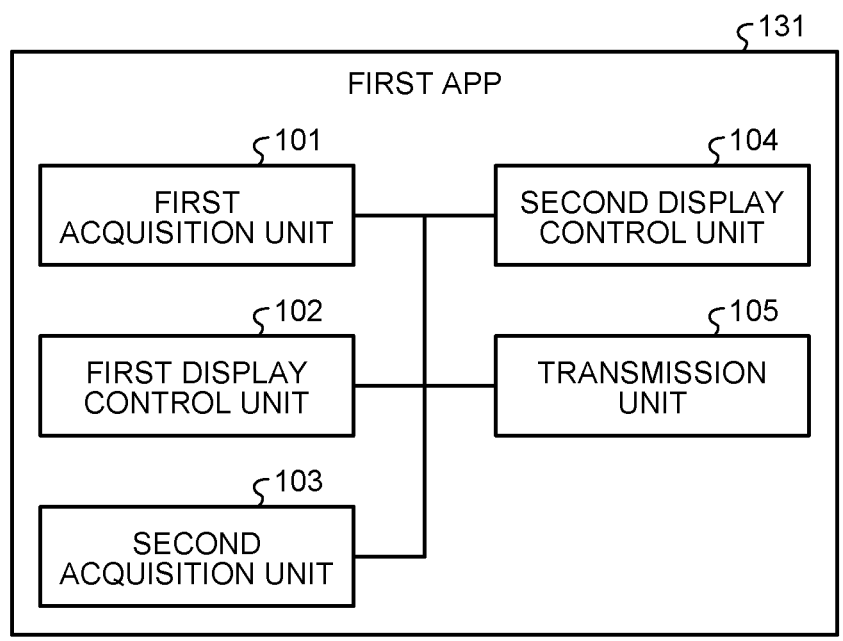
FIG. 3 is a block diagram illustrating an example of functions of a first app according to the first embodiment.

Next, the following describes details about the functions of the display control device 1 according to the present embodiment. FIG. 3 is a block diagram illustrating an example of the functions of the first app 131 according to the present embodiment. As illustrated in FIG. 3, the first app 131 includes a first acquisition unit 101, a first display control unit 102, a second acquisition unit 103, a second display control unit 104, and a transmission unit 105.

In FIG. 3, the first app 131 is exemplified, but the second app 132 similarly includes the first acquisition unit 101, the first display control unit 102, the second acquisition unit 103, the second display control unit 104, and the transmission unit 105.

By way of example, the first acquisition unit 101, the first display control unit 102, the second acquisition unit 103, the second display control unit 104, and the transmission unit 105 are stored and provided in the memory 11 as a computer-executable program. The processor 10 implements the functions corresponding to the respective units described above by reading out, from the memory 11, and executing the computer program. All of the first acquisition unit 101, the first display control unit 102, the second acquisition unit 103, the second display control unit 104, and the transmission unit 105 may be configured as an integrated computer program.

The computer program described above may be configured to be recorded and provided in a computer-readable recording medium such as an SD card as an installable or executable file. Moreover, the computer program described above may be configured to be stored in a computer connected to a network such as the Internet and provided by being downloaded via the network. The computer program described above may also be configured to be provided or distributed via a network such as the Internet.

The first acquisition unit 101 of the first app 131 acquires, via the first virtual OS 111, the image information that is received by the communication unit 14 from the information terminal 3 via the communication antenna 13. The first acquisition unit 101 also acquires control information from the first virtual OS 111. The first acquisition unit 101 sends out the received image information and control information to the first display control unit 102.

The control information is, for example, information including a control command for designating a display device as a display destination of the content image. For example, the first acquisition unit 101 acquires, from the first virtual OS 111, the control information designating the first display device 2a as the display destination of the content image. The control information designating the first display device 2a as the display destination of the content image is an example of first control information according to the present disclosure. The control information designating the second display device 2b as the display destination of the content image is an example of second control information according to the present disclosure.

The image information itself may include information designating the display device as the display destination of the content image. Alternatively, information of the display device as the display destination of the content image may be defined in the first app 131 in advance.

The first acquisition unit 101 of the second app 132 also acquires the image information and the control information from the first virtual OS 111 to be sent out to the first display control unit 102 of the second app 132.

The first display control unit 102 of the first app 131 generates the first content image on the basis of the image information acquired by the first acquisition unit 101. In this case, the first virtual OS 111 may cause the first content image to be displayed on the first touch screen 21a by controlling the first display device 2a.

Figure 4:
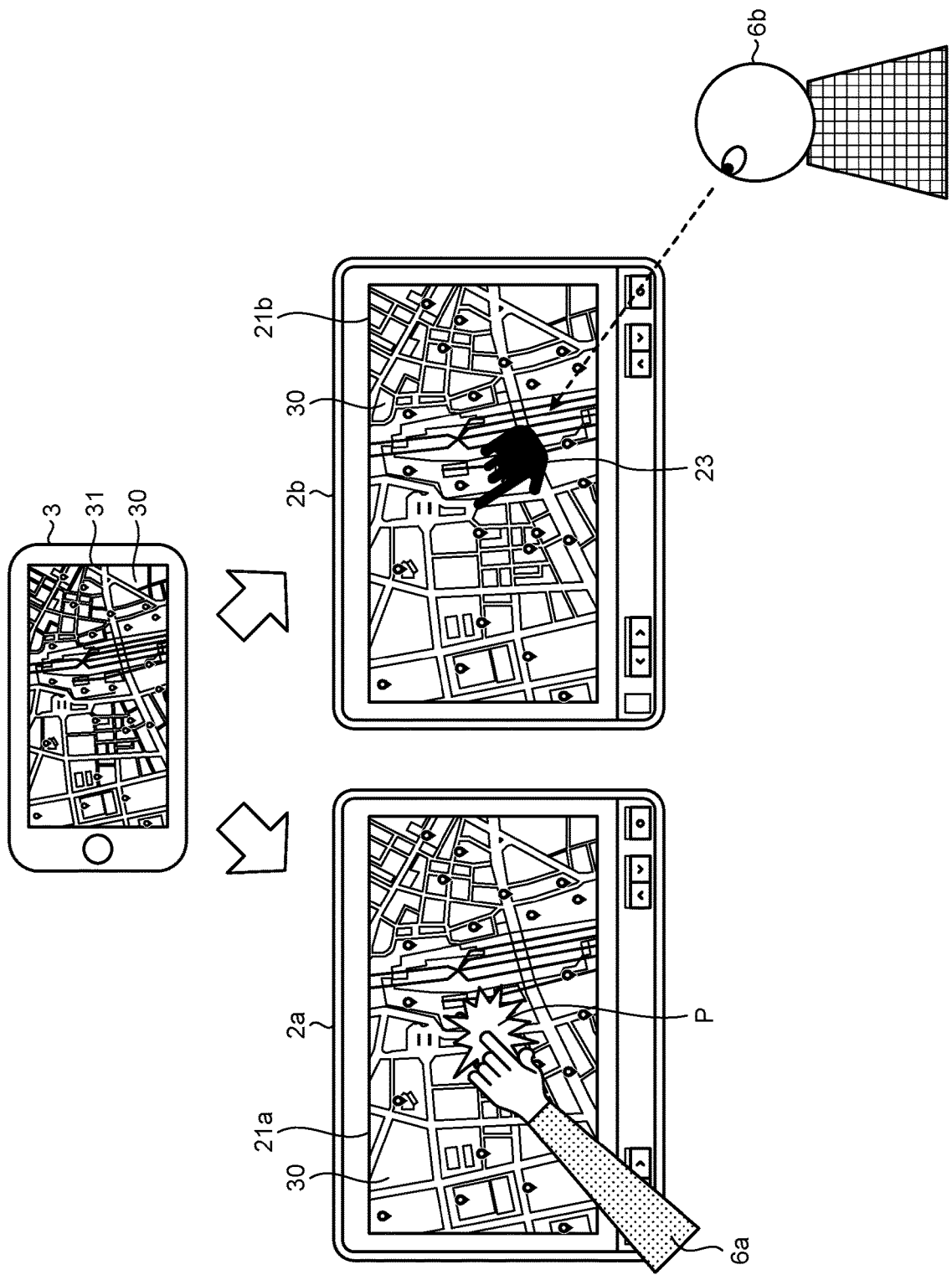
FIG. 4 is a diagram illustrating an example of screen display according to the first embodiment.

The following describes display of the content image with reference to FIG. 4. FIG. 4 is a diagram illustrating an example of screen display according to the present embodiment. As illustrated in FIG. 4, a content image 30 displayed on the display 31 of the information terminal 3 may be displayed on the first touch screen 21a of the first display device 2a.

The first display control unit 102 of the second app 132 generates the second content image on the basis of the image information acquired by the first acquisition unit 101. In this case, the second virtual OS 112 may cause the second content image to be displayed on the second touch screen 21b by controlling the second display device 2b.

Thus, a user 6a who uses the first display device 2a and a user 6b who uses the second display device 2b can visually recognize the same image as the content image 30 displayed on the display 31 of the information terminal 3. Hereinafter, in a case where the user 6a and the user 6b are not particularly distinguished from each other, they are each referred to as a user 6. The user 6a is an example of a first user according to the present disclosure. The user 6b is an example of a second user according to the present disclosure.

Returning to FIG. 3, in a case where the touch operation is performed in a range in which the content image 30 is displayed on the first touch screen 21a, the second acquisition unit 103 of the first app 131 receives touch coordinates indicating the touch position on the content image 30 from the first display device 2a. At this point, the second acquisition unit 103 receives the touch coordinates from the first display device 2a via the input/output unit 12.

In a case where the touch operation is performed in a range in which the content image 30 is displayed on the second touch screen 21b, the second acquisition unit 103 of the second app 132 receives touch coordinates indicating the touch position on the content image 30 from the second display device 2b.

The touch coordinates indicating the touch position at which the touch operation is performed in the range in which the content image 30 is displayed on the first touch screen 21a are an example of first coordinate information according to the present disclosure. The touch coordinates indicating the touch position at which the touch operation is performed in the range in which the content image 30 is displayed on the second touch screen 21b are an example of second coordinate information according to the present disclosure.

For example, in the example illustrated in FIG. 4, the user 6a who is using the first display device 2a is touching a touch position P on the content image 30 displayed on the first touch screen 21a. In this case, the second acquisition unit 103 of the first app 131 receives the touch coordinates indicating the touch position P on the content image 30.

In the present embodiment, it is assumed that, in a case where the touch operation is performed in a range in which the content image 30 is not displayed on the touch screen 21 during mirroring, the display device 2 does not transmit the coordinates indicating the touch position of the touch operation to the display control device 1. For example, due to a difference between an image size on the display 31 of the information terminal 3 and a screen size of the touch screen 21 of the display device 2, a range in which the content image 30 is not displayed may be generated on the touch screen 21. A touch operation in such a range is not an operation for the content image 30 and an operation for the information terminal 3, so that the display device 2 does not transmit the coordinates indicating the touch position of the touch operation to the display control device 1.

The second acquisition unit 103 sends out the received touch coordinates to the application that controls the other display device 2 and the transmission unit 105. In the present embodiment, the second acquisition unit 103 of the first app 131 sends out the received touch coordinates on the first touch screen 21a to the second app 132. Information is exchanged between the first app 131 and the second app 132 via the first virtual OS 111, the second virtual OS 112, and the hypervisor 110. For example, the information may be exchanged by inter-OS communication between the first virtual OS 111 and the second virtual OS 112.

Additionally, in a case where the touch operation is performed on the touch screen of the other display device 2, the second acquisition unit 103 acquires the touch coordinates on the touch screen of the other display device 2 from the application that controls the other display device 2. For example, in a case where the touch operation is performed on the second touch screen 21b of the first display device 2a, the second acquisition unit 103 of the first app 131 acquires the touch coordinates on the second touch screen 21b from the second app 132. The second acquisition unit 103 of the first app 131 sends out the acquired touch coordinates on the touch screen of the other display device 2 to the second display control unit 104.

Returning to FIG. 3, in a case where the second acquisition unit 103 receives the touch coordinates on the touch screen of the other display device 2, the second display control unit 104 generates an image on which a shadow image is superimposed at a position corresponding to the touch coordinates on the content image 30. In this case, the generated image may be displayed on the touch screen 21 disposed on the display device 2 other than the display device 2 as a transmission source of the touch coordinates.

More specifically, in a case where the second acquisition unit 103 receives the touch coordinates on the second touch screen 21b of the second display device 2b, the second display control unit 104 of the first app 131 generates an image on which the shadow image is superimposed at the position corresponding to the received touch coordinates on the content image 30 displayed on the first touch screen 21a of the first display device 2a.

In a case where the second acquisition unit 103 receives the touch coordinates on the first touch screen 21a of the first display device 2a, the second display control unit 104 of the second app 132 generates an image on which the shadow image is superimposed at the position corresponding to the received touch coordinates on the content image 30 displayed on the second touch screen 21b of the second display device 2b.

For example, as illustrated in FIG. 4, in a case where the touch operation is performed at the touch position P on the first touch screen 21a, the second display control unit 104 of the second app 132 generates an image on which a black shadow image 23 having a hand shape is superimposed at the position corresponding to the touch position P on the second touch screen 21b. The generated image may be displayed on the second touch screen 21b under the control of the second virtual OS 112. In FIG. 4, the touch operation is performed only on the first touch screen 21a, but the touch operation may be performed on both of the first touch screen 21a and the second touch screen 21b at the same time.

The shadow image 23 is an image representing the touch position in a range in which the content image 30 is displayed on the other touch screen 21. The shadow image 23 is, for example, an icon image having a shape of a hand, a finger, a touch pen, an arrow, and the like, but is not limited thereto.

Returning to FIG. 3, in a case where the second acquisition unit 103 receives the touch coordinates, the transmission unit 105 transmits the touch coordinates to the information terminal 3 via the communication unit 14 and the communication antenna 13.

Next, the following describes a processing procedure performed by the hypervisor 110, the first virtual OS 111, and the second virtual OS 112 in the display control system S according to the present embodiment that is configured as described above.

Figure 5:
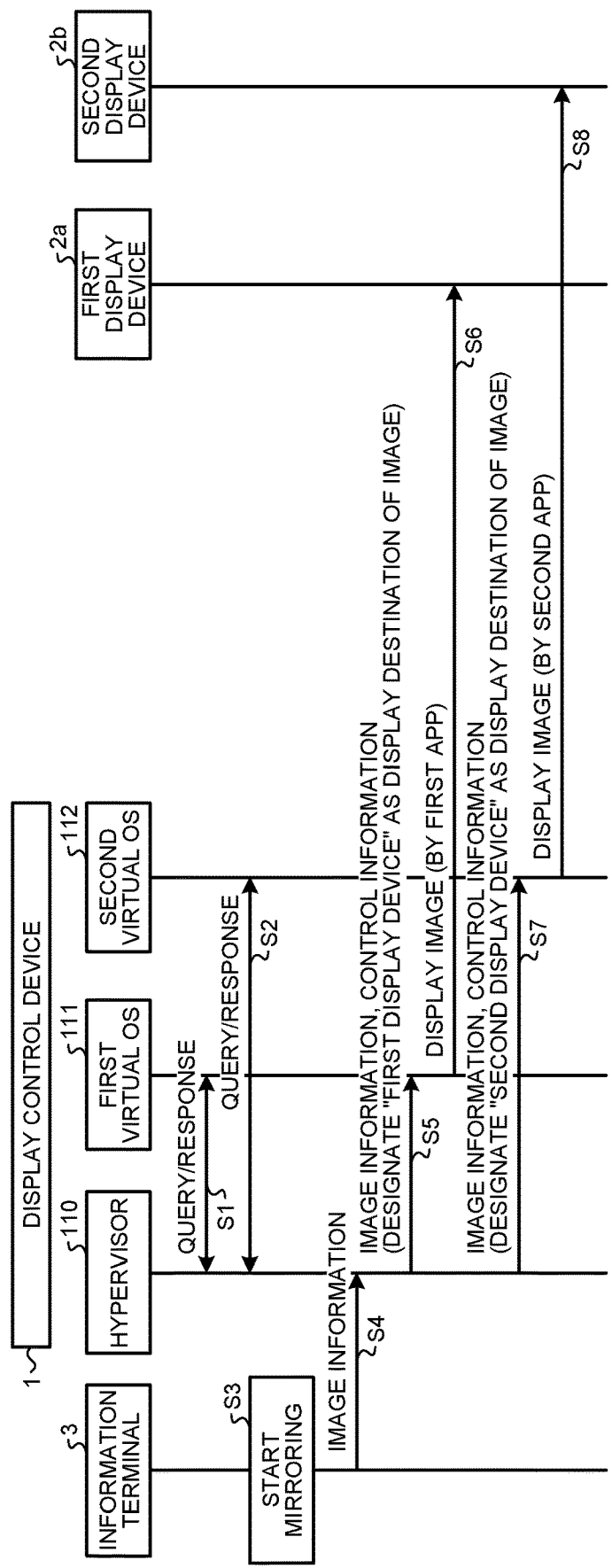
FIG. 5 is a diagram illustrating an example of a processing procedure in a normal state performed by the display control system according to the first embodiment.

FIG. 5 is a diagram illustrating an example of the processing procedure in a normal state in the display control system S according to the present embodiment.

The hypervisor 110 and the first virtual OS 111 transmit a query and a response thereto at predetermined time intervals (S1).

More specifically, the hypervisor 110 transmits a query to the first virtual OS 111 at predetermined time intervals. In a case where the query is received, the first virtual OS 111 transmits the response to the hypervisor 110. In a case where the response to the transmitted query is received, the hypervisor 110 determines that the first virtual OS 111 is normally operating. In a case where there is no response to the transmitted query, the hypervisor 110 determines that a failure occurs in the first virtual OS 111. In the processing illustrated in FIG. 5, it is assumed that the response is transmitted from the first virtual OS 111.

The hypervisor 110 also transmits a query to the second virtual OS 112 at predetermined time intervals, and the second virtual OS 112 transmits a response to the hypervisor 110 in a case where the query is received (S2).

For example, in a case where an operation of starting mirroring for the first display device 2a and the second display device 2b by the user is received, the information terminal 3 starts mirroring (S3). The user who operates the information terminal 3 may be the same user as the user 6 who uses the first display device 2a or the second display device 2b, of may be a different user.

When mirroring is started, the information terminal 3 transmits the image information indicating the content image 30 displayed on the display 31 of the information terminal 3 to the display control device 1 (S4). The hypervisor 110 of the display control device 1 receives the image information transmitted from the information terminal 3.

The hypervisor 110 then transmits the received image information and the control information to the first virtual OS 111 (S5). The hypervisor 110 is assumed to transfer the image information to the first virtual OS 111 without performing conversion processing or the like on the image information. In this case, the control information includes a control command for designating the first display device 2a as a display destination of the content image 30 based on the image information.

A method of generating the control information is not particularly limited. For example, the memory 11 may store information indicating correspondence between each of the first display device 2a and the second display device 2b connected to the display control device 1 and the first app 131 and the second app 132 controlling the first display device 2a and the second display device 2b. In this case, on the basis of the information indicating the correspondence stored in the memory 11, the hypervisor 110 transmits, the control information designating the first display device 2a as the display destination to the first virtual OS 111. Moreover, on the basis of the information indicating the correspondence stored in the memory 11, the hypervisor 110 transmits the control information designating the second display device 2b as the display destination to the second virtual OS 112.

The first app 131 operating on the first virtual OS 111 generates the content image 30 on the basis of the image information acquired from the hypervisor 110. The first virtual OS 111 then causes the first touch screen 21a of the first display device 2a to display the generated content image 30, the first touch screen 21a being the display destination designated by the control information acquired from the hypervisor 110 (S6). The hypervisor 110 also transmits the received image information and the control information to the second virtual OS 112 (S7). In this case, the control information includes a control command for designating the second display device 2b as the display destination of the content image 30 based on the image information.

In FIG. 5, for convenience of explanation of the processing, an execution timing of the processing at S7 is illustrated after an execution timing of the processing at S5. However, the pieces of processing at S5 and S7 may be performed at the same time, or the processing at S7 may be performed before the processing at S5.

The second app 132 operating on the second virtual OS 112 generates the content image 30 on the basis of the image information acquired from the hypervisor 110. The second virtual OS 112 then causes the second touch screen 21*b* of the second display device 2*b* to display the generated content image 30, the second touch screen 21*b* being the display destination designated by the control information acquired from the hypervisor 110 (S8).

Next, the following describes a processing procedure in a case where a failure has occurred in any of the virtual OSs in the display control device 1.

Figure 6:
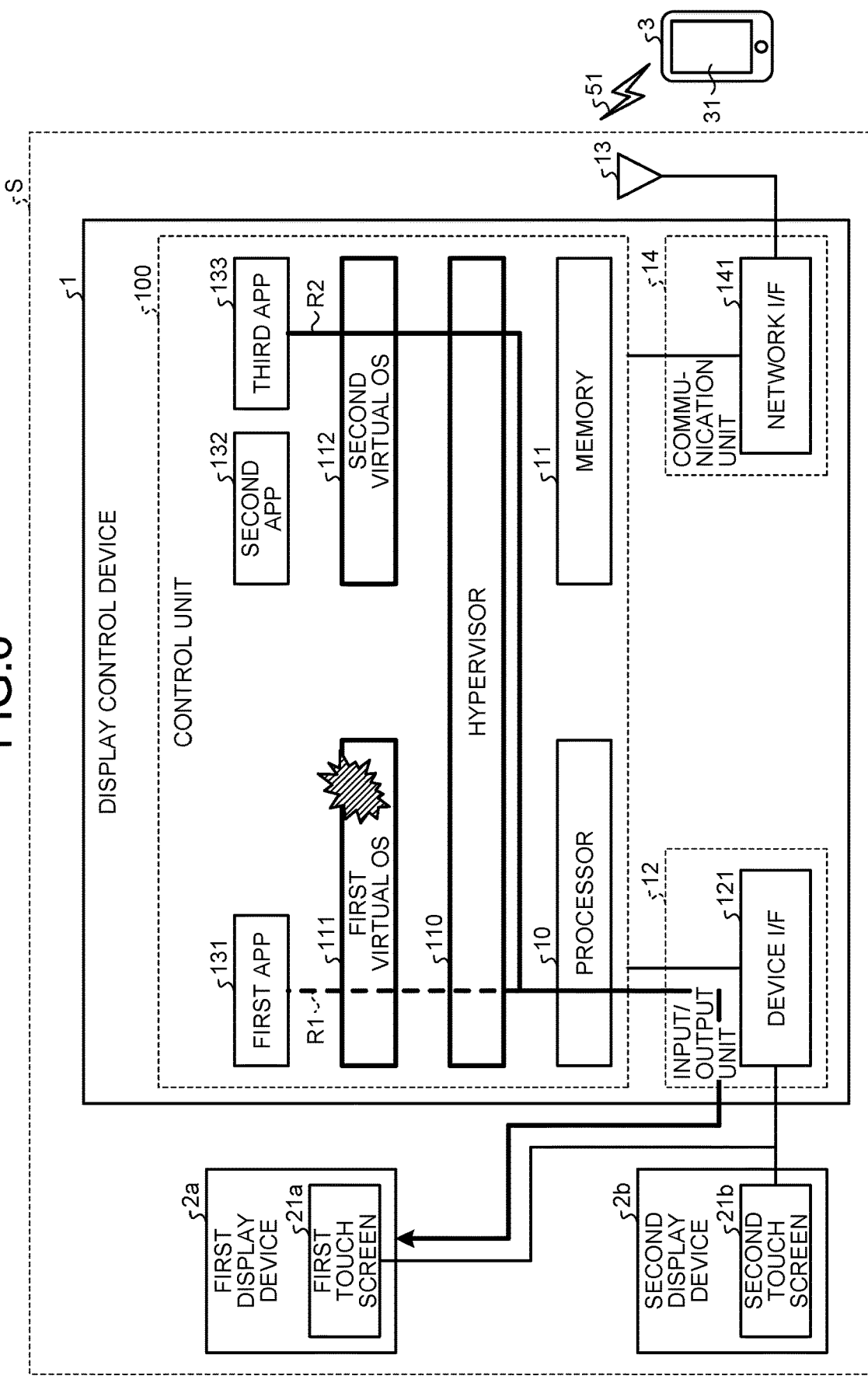
FIG. 6 is a diagram for explaining a case where a failure occurs in a display control device according to the first embodiment.

For example, FIG. 6 is a diagram for explaining a case where a failure has occurred in the display control device 1 according to the present embodiment. As illustrated in FIG. 6, it is assumed that a failure has occurred in the first virtual OS 111. In the present embodiment, "a failure has occurred" means a state in which the first virtual OS 111 or the second virtual OS 112 cannot normally operate. The failure in the present embodiment may be a hardware failure or a software failure. In this case, in a case where the response to the query transmitted to the first virtual OS 111 is not returned, the hypervisor 110 detects occurrence of a failure in the first virtual OS 111.

The hypervisor 110 according to the present embodiment is assumed to be able to detect at least occurrence of a failure related to the first virtual OS 111. The hypervisor 110 may also be able to detect occurrence of a failure related to the second virtual OS 112.

In a case where a failure has occurred in the first virtual OS 111, the hypervisor 110 causes the second virtual OS 112 to start the third app 133. After the third app 133 is started, the third app 133 executed on the second virtual OS 112 performs control processing for the first display device 2*a* that has been performed by the first app 131 executed on the first virtual OS 111. Thus, as illustrated in FIG. 6, in a case where a failure has occurred in the first virtual OS 111, a path along which the content image 30 is transmitted to the first display device 2*a* is changed from a transmission path R1 for the content image 30 in a case where the first virtual OS 111 is normally operating to the transmission path R2. As described above, the third app 133 may have the same functions as those of the first app 131, or may have a smaller number of functions than those of the first app 131.

Figure 7:
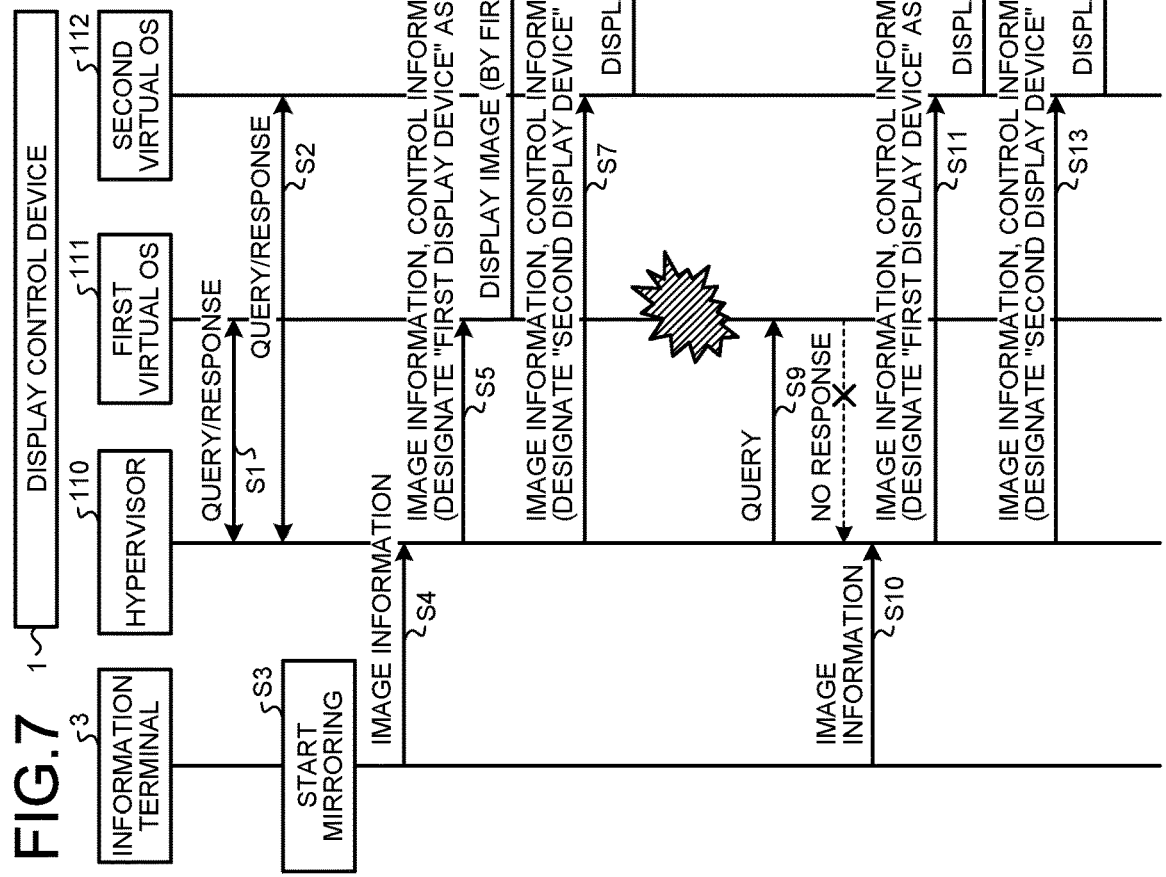
FIG. 7 is a diagram illustrating an example of a processing procedure at the time when a failure occurs in the display control system according to the first embodiment.

FIG. 7 is a diagram illustrating an example of a processing procedure at the time when a failure has occurred in the display control system S according to the present embodiment.

The processing of transmitting the query and the response at S1 to the processing of causing the content image 30 to be displayed at S8 are the same as the pieces of processing in the normal state described above with reference to FIG. 5.

It is assumed here that a failure has occurred in the first virtual OS 111. In this case, there is no response to the query transmitted at S9 from the first virtual OS 111, so that the hypervisor 110 detects that the failure has occurred in the first virtual OS 111.

Next, the information terminal 3 transmits the image information to the display control device 1 (S10). The hypervisor 110 of the display control device 1 receives the image information transmitted from the information terminal 3.

In this case, the hypervisor 110 transmits the received image information and the control information to the second virtual OS 112 (S11). In this case, the control information includes a control command for designating the first display device 2*a* as a display destination of the content image 30 based on the image information.

In a case where occurrence of a failure related to the first virtual OS 111 is detected and the first image information indicating the first content image is received from the information terminal 3 present in the vehicle 4, the hypervisor 110 transmits, to the second virtual OS 112, control information for causing the first display device 2*a* to display the first image information.

That is, after the failure has occurred in the first virtual OS 111, the hypervisor 110 transmits the image information and the control information for displaying the content image 30 on the first display device 2*a* to the second virtual OS 112 instead of the first virtual OS 111.

The third app 133 operating on the second virtual OS 112 generates the content image 30 on the basis of the image information acquired from the hypervisor 110. The second virtual OS 112 then causes the first touch screen 21*a* of the first display device 2*a* to display the generated content image 30, the first touch screen 21*a* being the display destination designated by the control information acquired from the hypervisor 110 (S12).

Similarly to the processing at S7, the hypervisor 110 transmits the received image information and the control information to the second virtual OS 112 (S13). In this case, the control information includes a control command for designating the second display device 2*b* as the display destination of the content image 30 based on the image information.

Similarly to S8, the second app 132 operating on the second virtual OS 112 generates the content image 30 on the basis of the image information acquired from the hypervisor 110. The second virtual OS 112 then causes the second touch screen 21*b* of the second display device 2*b* to display the generated content image 30, the second touch screen 21*b* being the display destination designated by the control information acquired from the hypervisor 110 (S14).

In this way, in a case where a failure has occurred in the first virtual OS 111, the third app 133 operating on the second virtual OS 112 generates the content image 30 to be displayed on the first touch screen 21*a* of the first display device 2*a*. Thus, even in a case where a failure has occurred in the first virtual OS 111, the user 6*a* who uses the first display device 2*a* can view the content image 30.

In FIG. 6 and FIG. 7, a failure has occurred in the first virtual OS 111. In a case where a failure has occurred in the second virtual OS 112, the first virtual OS 111 may be substituted for the function of the second virtual OS 112 by executing another application having the function of the second app 132 under the control of the hypervisor 110.

Next, the following describes details about a procedure for display control processing performed by the display control system S according to the present embodiment that is configured as described above.

Figure 8:
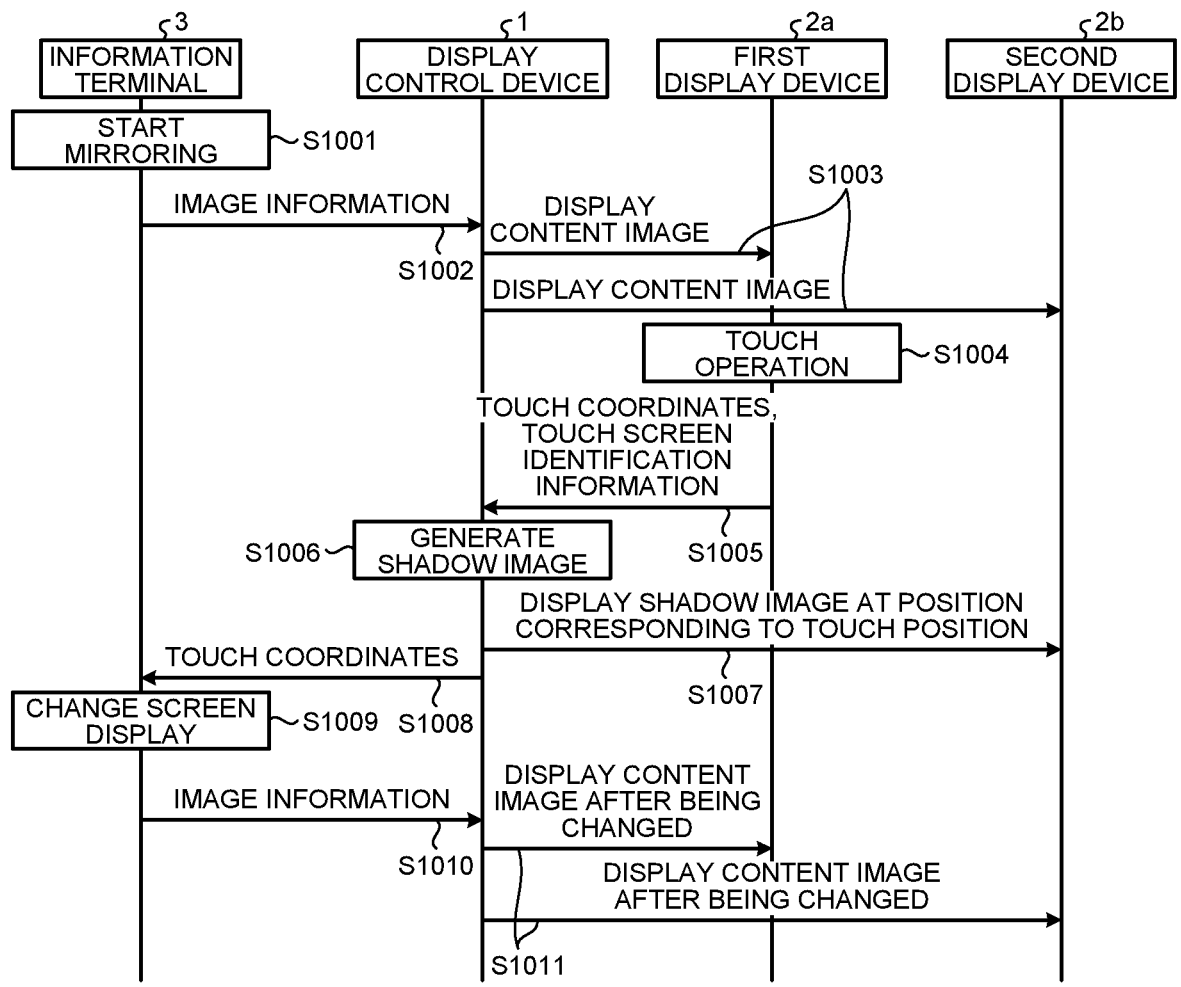
FIG. 8 is a sequence diagram illustrating an example of a procedure for display control processing performed by the display control system according to the first embodiment.

FIG. 8 is a sequence diagram illustrating an example of the procedure for display control processing performed by the display control system S according to the present embodiment. FIG. 8 mainly explains processing performed by the first app 131 and the second app 132, so that the hypervisor 110 is not illustrated.

Start of mirroring at 51001 is the same as the processing described above at S3 in FIG. 5. Transmission processing for the image information from the information terminal 3 to the display control device 1 at S1002 is the same as the processing described above at S4 in FIG. 5.

The display control device 1 controls the first display device 2*a* and the second display device 2*b* on the basis of the acquired image information to cause the content image 30 to be displayed on the first touch screen 21*a* and the second touch screen 21*b* (S1003).

More specifically, the first display control unit 102 of the first app 131 operating on the first virtual OS 111 of the display control device 1 generates the content image 30 on the basis of the image information acquired by the first acquisition unit 101 of the first app 131. The first virtual OS 111 then controls the first display device 2*a* to cause the content image 30 to be displayed on the first touch screen 21*a*.

The first display control unit 102 of the second app 132 operating on the second virtual OS 112 of the display control device 1 generates the content image 30 on the basis of the image information acquired by the first acquisition unit 101 of the second app 132. The second virtual OS 112 then controls the second display device 2*b* to cause the content image 30 to be displayed on the second touch screen 21*b* of the second display device 2*b*.

In a case where the touch operation is performed by the user 6 in a range in which the content image 30 is displayed on the first touch screen 21*a* of the first display device 2*a* (S1004), the first display device 2*a* transmits the touch coordinates indicating the touch position P on the content image 30 and touch screen identification information indicating the first touch screen 21*a* to the display control device 1 (S1005). In this case, the display control device 1 receives the touch coordinates and the touch screen identification information transmitted from the first display device 2*a*.

The touch screen identification information is identification information that can specify the touch screen 21 on which the touch operation is performed. In a case where one touch screen 21 is provided to each of the display devices 2, identification information that can specify the display device 2 instead of the touch screen 21 may be used.

More specifically, the second acquisition unit 103 of the first app 131 operating on the first virtual OS 111 of the display control device 1 receives the touch coordinates indicating the touch position on the content image 30. In other words, in a case where the touch operation is performed by the user 6*a* in the range in which the content image 30 is displayed on the first touch screen 21*a*, the first virtual OS 111 receives the touch coordinates indicating a contact position on the content image 30 from the display control device 1. The second acquisition unit 103 of the first app 131 also sends out the received touch coordinates on the first touch screen 21*a* to the second app 132.

The second acquisition unit 103 of the second app 132 operating on the second virtual OS 112 also acquires the touch coordinates on the first touch screen 21*a* from the first app 131.

Next, the display control device 1 generates the shadow image 23 (S1006).

More specifically, the second display control unit 104 of the second app 132 operating on the second virtual OS 112 generates the shadow image to be superimposed on the content image 30 displayed on the second touch screen 21*b* of the second display device 2*b*.

The second display control unit 104 of the second app 132 then generates an image on which the shadow image 23 is superimposed at a position corresponding to the touch position P on the content image 30 displayed on the second touch screen 21*b*. The second virtual OS 112 then controls the second display device 2*b* to cause the image to be displayed on the second touch screen 21*b* (S1007).

The second display control unit 104 of the second app 132 may individually transmit the content image 30 and the shadow image 23 to be superimposed on the content image 30 to the second display device 2*b*, but may transmit the content image 30 on which the shadow image 23 is superimposed to the second display device 2*b*. In other words, in a case where the first virtual OS 111 receives the touch coordinates, the second app 132 operating on the second virtual OS 112 may generate the content image 30 for notification on which the shadow image 23 is superimposed at the position corresponding to the touch coordinates on the content image 30 displayed on the second touch screen 21*b*. The content image 30 for notification on which the shadow image 23 is superimposed is an example of a third content image.

The display control device 1 transmits the touch coordinates received from the first display device 2*a* to the information terminal 3 (S1008). In other words, the display control device 1 feeds back, to the information terminal 3, the touch operation performed by the user 6 on the content image 30 distributed by mirroring from the information terminal 3.

More specifically, in a case where the second acquisition unit 103 of the first app 131 acquires the touch coordinates, the transmission unit 105 of the first app 131 operating on the first virtual OS 111 on the hypervisor 110 of the display control device 1 transmits the touch coordinates to the information terminal 3 via the hypervisor 110, the communication unit 14, and the communication antenna 13. In other words, in a case where the touch coordinates are received from the first display device 2*a*, the hypervisor 110 transmits the received touch coordinates to the information terminal 3.

The information terminal 3 then performs various kinds of processing on the basis of the touch coordinates transmitted from the display control device 1. By way of example, the information terminal 3 changes screen display of the display 31 on the basis of the touch coordinates transmitted from the display control device 1 (S1009).

Next, the information terminal 3 transmits image information indicating the content image 30 after being changed to the display control device 1 (S1010).

The display control device 1 then controls the first display device 2*a* and the second display device 2*b* on the basis of the received image information, and causes the first touch screen 21*a* and the second touch screen 21*b* to display the content image 30 after being changed (S1011).

More specifically, the first display control unit 102 of the first app 131 operating on the first virtual OS 111 of the display control device 1 generates the content image 30 after being changed on the basis of the image information after being changed that is acquired by the first acquisition unit 101 of the first app 131. The first virtual OS 111 then controls the first display device 2*a* to cause the content image 30 to be displayed on the first touch screen 21*a*.

The first display control unit 102 of the second app 132 operating on the second virtual OS 112 of the display control device 1 generates the content image 30 on the basis of the image information after being changed that is acquired by the first acquisition unit 101 of the second app 132. The second virtual OS 112 then controls the second display device 2*b* to cause the content image 30 after being changed to be displayed on the second touch screen 21*b* of the second display device 2*b*.

FIG. 8 exemplifies a case where the touch operation is performed on the first touch screen 21*a* to explain the processing procedure. In a case where the touch operation is performed on the second touch screen 21b, similarly, the display control device 1 displays the shadow image 23 on the first touch screen 21a. In a case where both of the first touch screen 21a and the second touch screen 21b are operated at the same time, the shadow image 23 indicating the touch position P on the first touch screen 21a is displayed on the second touch screen 21b, and the shadow image 23 indicating the touch position P on the second touch screen 21b is displayed on the first touch screen 21a.

In the related art, in a case where an image is distributed from one information terminal to multiple display devices, and a touch operation is performed on the image on a touch screen of each of the display devices, an operation unintended by the user may be performed in some cases.

For example, in a case where the user performs the touch operation on the touch screen, another user may perform the touch operation on a touch screen of another display device. In such a case, the information terminal 3 receives touch operations of both users, so that an operation different from an operation intended by each of the users may be performed by the information terminal 3.

Specifically, it is assumed here that a certain user touches one point on the first touch screen, and another user touches one point on the second touch screen. In this case, each user recognizes that the user is performing an operation of touching the one point, but the information terminal 3 receives the operation as an operation of touching two points because the information terminal 3 does not distinguish between the first touch screen and the second touch screen. Thus, for example, in a case where any of the users intends to perform a swipe operation and moves his/her finger while touching the touch screen, the information terminal 3 receives the operation as an input of a pinch-in (reducing) or pinch-out (enlarging) operation. In this case, an operation unintended by each user is performed, so that each user may misunderstand that the touch screen or the information terminal 3 is malfunctioning.

Additionally, an operation performed on the other touch screen by the other user is unknown, so that the content image is changed by the operation performed by the other user on the other touch screen, and the user may feel a sense of incongruity in some cases.

On the other hand, in a case where the touch operation is performed in the range in which the content image 30 is displayed on the first touch screen 21a, the display control device 1 according to the present embodiment receives the touch coordinates indicating the contact position on the content image 30 from the first display device 2a, and displays the shadow image 23 to be superimposed on the position corresponding to the touch coordinates on the content image 30 displayed on the second touch screen 21b. Due to this, the display control device 1 according to the present embodiment can cause the user 6b of the second touch screen 21b to recognize the touch position P1 on the first touch screen 21a, so that the user 6b can operate the second touch screen 21b while recognizing the operation performed by the other user 6a. Thus, with the display control device 1 according to the present embodiment, even in a case where the content image 30 is distributed from the one information terminal 3 to the display devices 2, it is possible to prevent an operation unintended by the user 6b from being performed.

For example, with the display control device 1 according to the present embodiment, the user 6b of the second touch screen 21b can stand by for the touch operation in a case where the touch operation is performed on the first touch screen 21a, or can perform the touch operation together with the other user 6a in collaboration while recognizing the touch position P of the other user 6a who uses the first touch screen 21a. As a result, an operation unintended by the user 6b is prevented from being performed.

The shadow image 23 according to the present embodiment is an image representing the touch position in the range in which the content image 30 is displayed on the other touch screen 21, so that the user 6 can easily grasp that the other touch screen 21 is being operated and the touch position P1 of the operation on the other touch screen 21.

Additionally, in a case where the touch operation is performed in the range in which the content image 30 is displayed on the second touch screen 21b, the display control device 1 according to the present embodiment receives the touch coordinates indicating the contact position on the content image 30 from the second display device 2b, and displays the shadow image 23 to be superimposed on the position corresponding to the touch coordinates on the content image 30 displayed on the first touch screen 21a. Due to this, with the display control device 1 according to the present embodiment, the user 6a who is using the first touch screen 21a and the user 6b who is using the second touch screen 21b can mutually recognize the touch position P. Thus, with the display control device 1 according to the present embodiment, in a case where the touch operation is performed on any of the touch screens 21, an operation unintended by the user 6 can be prevented from being performed without performing exclusive control not to accept the operation on the other touch screen 21. Accordingly, with the display control device 1 according to the present embodiment, it is possible to prevent the user 6 from feeling a sense of incongruity due to a waiting time for switching of exclusive control.

Figure 9:
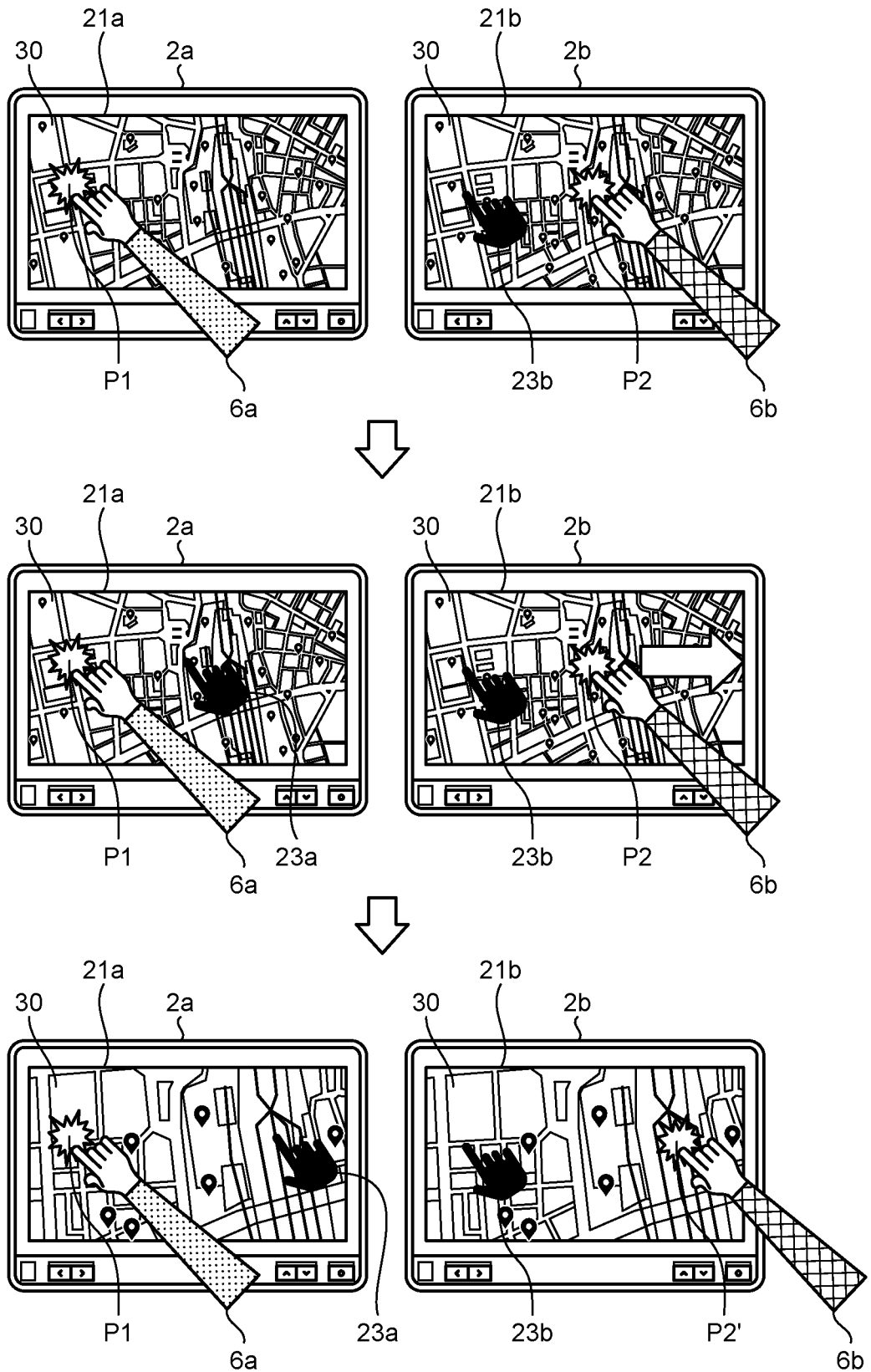
FIG. 9 is a diagram illustrating an example of time-series changes in screen display of a first touch screen and a second touch screen according to the first embodiment.

With reference to FIG. 9, the following describes an example in which the users 6 who are using different touch screens 21 perform the touch operation in collaboration.

FIG. 9 is a diagram illustrating an example of time-series changes in the screen display of the first touch screen 21a and the second touch screen 21b according to the present embodiment. As illustrated in FIG. 9, it is assumed that the content image 30 is displayed on the first touch screen 21a and the second touch screen 21b. First, as illustrated in an upper diagram of FIG. 9, the user 6a is assumed to perform the touch operation on the first touch screen 21a with a finger or the like. The position at which the touch operation is performed is assumed to be the touch position P1. In this case, as illustrated in the upper diagram of FIG. 9, the display control device 1 displays a shadow image 23b at the position corresponding to the touch position P1 on the second touch screen 21b. Due to the shadow image 23b, the user 6b can recognize the position at which the user 6a performs the touch operation on the content image 30.

Next, as illustrated in the upper diagram of FIG. 9, the user 6b is assumed to touch the second touch screen 21b with a finger or the like. The touched position is assumed to be a touch position P2. In this case, as illustrated in a middle diagram of FIG. 9, the display control device 1 displays a shadow image 23a at the position corresponding to the touch position P2 on the first touch screen 21a. Due to the shadow image 23a, the user 6a can also recognize the position at which the user 6b performs the touch operation on the content image 30.

Herein, for example, as illustrated in the middle diagram of FIG. 9, the user 6b is assumed to perform a swipe operation by moving his/her finger in a direction away from the shadow image 23b while touching the second touch screen 21b. As illustrated in a lower diagram of FIG. 9, a position after the movement is assumed to be a touch position P2'. Such an operation is the same operation, for the information terminal 3, as that in a case where the user 6 performs a pinch-out operation while touching two points on the display 31. Thus, as illustrated in the lower diagram of FIG. 9, the enlarged content image 30 is displayed on the first touch screen 21a and the second touch screen 21b.

The user 6b can recognize the touch position P2 on the first touch screen 21a due to the shadow image 23a, so that the user 6b can perform the operation while grasping whether the swipe operation performed by himself/herself becomes a pinch-out operation or a pinch-in operation. Due to this, the user 6b can cause the information terminal 3 to perform an operation intended by himself/herself. In a case where the user 6b changes the touch position P2 to the touch position P2', the display control device 1 displays the shadow image 23a at a position corresponding to the touch position P2' on the first touch screen 21a, so that the user 6a can recognize that the user 6b has performed the swipe operation on the second touch screen 21b. Due to this, with the display control device 1 according to the present embodiment, even when the content image 30 displayed on the first touch screen 21a is enlarged by the pinch-out operation performed by the user 6b, the user 6a can be prevented from misunderstanding that the first touch screen 21a or the information terminal 3 is malfunctioning.

The example illustrated in FIG. 9 is an example of an operation performed by the users 6 who are using the different touch screens 21 in collaboration. An example of utilizing the display control system S according to the present embodiment is not limited thereto. For example, when the users 6 play a match in a game and the like, the display control system S according to the present embodiment may be applied so that the users 6 can operate the same game screen via the different touch screens 21.

In this way, the display control device 1 according to the present embodiment includes the first virtual OS 111 that controls execution of at least one of the first app 131 that generates the content image 30 to be displayed on the first display device 2a mounted on the vehicle 4 and the second app 132 that generates the content image 30 to be displayed on the second display device 2b mounted on the vehicle 4, the second virtual OS 112 different from the first virtual OS 111, and the hypervisor 110 that is executed on the processor 10 to control execution of the first virtual OS 111 and the second virtual OS 112. Thus, with the display control device 1 according to the present embodiment, in a case where a failure occurs in any of the OSs, the other OS can be substituted for performing the processing, so that robustness can be improved as compared with a case of performing the processing by one OS.

In the display control device 1 according to the present embodiment, in a case where the image information is received from the information terminal 3 present in the vehicle 4, the first app 131 generates the content image 30 on the basis of the image information, and the second app 132 generates the content image 30 on the basis of the image information. Due to this, with the display control device 1 according to the present embodiment, an image to be displayed on the display devices 2 can be generated by the one display control device 1.

In the display control device 1 according to the present embodiment, the first display device 2a includes the first touch screen 21a. The second display device 2b includes the second touch screen 21b. In the present embodiment, in a case where the touch operation is performed by the user 6a in the range in which the content image 30 is displayed on the first touch screen 21a, the first virtual OS 111 receives the touch coordinates indicating the contact position on the content image 30 from the first display device 2a. In the present embodiment, in a case where the first virtual OS 111 receives the first coordinate information, the second app 132 generates the content image 30 for notification on which the shadow image 23 is superimposed at the position corresponding to the touch coordinates on the content image 30 displayed on the second touch screen 21b. The shadow image 23 is an image indicating that the touch operation is performed in the range in which the content image 30 is displayed on the first touch screen 21a. Thus, with the display control device 1 according to the present embodiment, the user 6b who is using the second display device 2b can recognize the touch position P2 on the first touch screen 21a due to the shadow image 23a.

In the display control device 1 according to the present embodiment, in a case where the touch coordinates are received from the first display device 2a, the first virtual OS 111 transmits the received touch coordinates to the information terminal 3. Due to this, the display control device 1 according to the present embodiment can feed back, to the information terminal 3, the touch operation performed on the first touch screen 21a by the user 6a. With this configuration, the user 6a can perform an operation for the information terminal 3 by performing the touch operation on the first touch screen 21a without directly operating the information terminal 3.

In the display control device 1 according to the present embodiment, the hypervisor 110 detects at least occurrence of a failure related to the first virtual OS 111. Due to this, the display control device 1 according to the present embodiment can perform processing of substituting the other virtual OS for performing the processing of an application operating on the first virtual OS 111, for example, the first app 131.

In the display control device 1 according to the present embodiment, the second virtual OS 112 controls at least execution of the third app 133 that generates the content image 30 to be displayed on the first display device 2a. In a case where occurrence of a failure related to the first virtual OS 111 is detected and the first image information indicating the first content image is received from the information terminal 3 present in the vehicle 4, the hypervisor 110 of the display control device 1 according to the present embodiment transmits, to the second virtual OS 112, the control information for causing the first display device 2a to display the first image information. In this case, the third app 133 generates the content image 30 to be displayed on the first display device 2a on the basis of the transmitted image information. Due to this, with the display control device 1 according to the present embodiment, in a case where a failure has occurred in the first virtual OS 111, the third app 133 executed on the second virtual OS 112 can generate the content image 30 to be displayed on the first display device 2a instead of the first app 131 executed on the first virtual OS 111. Accordingly, in a case where a failure has occurred in the first virtual OS 111, the content image 30 can be displayed on the first touch screen 21a of the first display device 2a.

At least one of the OSs included in the display control device 1 according to the present embodiment is a virtual OS. Thus, the display control device 1 according to the present embodiment can easily diversify risk of occurrence of a failure.

The first display device 2a to which the display control device 1 according to the present embodiment transmits the content image 30 is disposed at a position that is visible to the first user 6a seated on the rear seat of the vehicle 4. The second display device 2b to which the display control device 1 according to the present embodiment transmits the content image is disposed at a position that is visible to the second user 6b seated on the rear seat of the vehicle 4. Thus, the display control device 1 according to the present embodiment can cause the different users 6 seated on the rear seat of the vehicle 4 to view the content image 30 by respectively using the different display devices 2.

The hypervisor 110 of the display control device 1 according to the present embodiment transmits a query to the first virtual OS 111 at predetermined time intervals, and determines that a failure has occurred in the first virtual OS 111 if there is no response to the query from the first virtual OS 111. Thus, even in a case where the first virtual OS 111 does not output an error when a failure has occurred in the first virtual OS 111, the display control device 1 according to the present embodiment can detect occurrence of a failure in the first virtual OS 111.

In the display control device 1 according to the present embodiment, the first virtual OS 111 controls at least execution of the first app 131, and the second virtual OS 112 controls at least execution of the second app 132. In a case where the image information is received from the information terminal 3 present in the vehicle 4, the hypervisor 110 transmits, to the first virtual OS 111, the image information and the control information for causing the first display device 2a to display the content image 30 based on the image information. The hypervisor 110 also transmits, to the second virtual OS 112, the image information and the control information for causing the second display device 2b to display the content image 30 on the basis of the image information. The first app 131 generates the content image 30 on the basis of the image information. The second app 132 generates the content image 30 on the basis of the image information. In this way, in the display control device 1 according to the present embodiment, the different OSs and the different apps respectively control the first display device 2a and the second display device 2b, so that, in a case where a failure has occurred in the OS or the app the number of the display devices 2 affected by the failure can be reduced.

The display control device 1 according to the present embodiment is connected to the information terminal 3 via wireless communication, so that the position of the information terminal 3 within the vehicle 4 is not restricted.

Second Embodiment

In the first embodiment described above, the display control device 1 controls the display devices 2. A second embodiment describes a configuration in which two display control devices 1 control the display devices 2.

Figure 10:
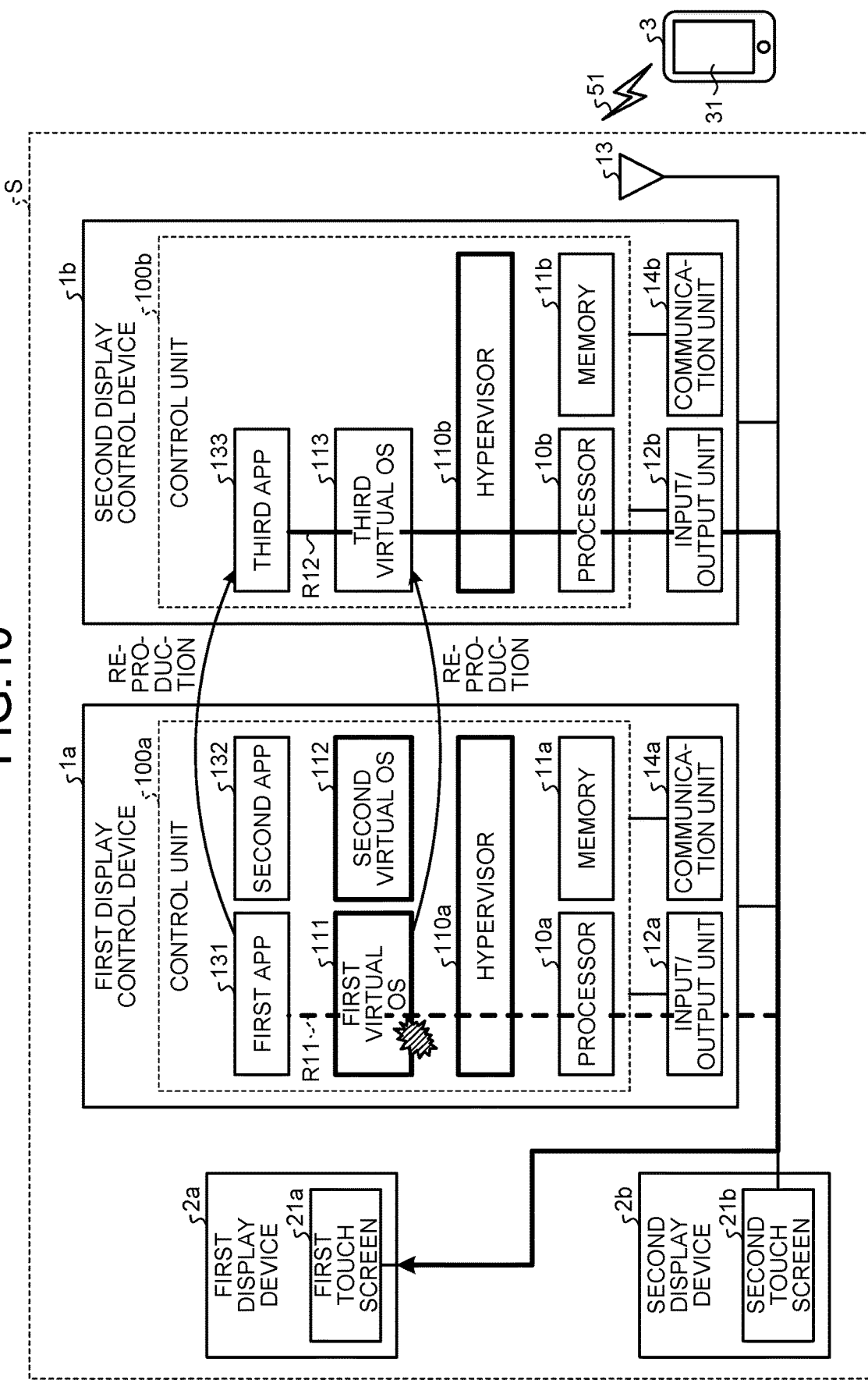
FIG. 10 is a diagram illustrating an example of a configuration of a display control system according to a second embodiment.

FIG. 10 is a diagram illustrating an example of a configuration of the display control system S according to the second embodiment. In the present embodiment, the display control system S includes a first display control device 1a, a second display control device 1b, the first display device 2a, and the second display device 2b.

Configurations of the first display device 2a and the second display device 2b are the same as those in the first embodiment.

The first display control device 1a includes a processor 10a, a memory 11a, an input/output unit 12a, and a communication unit 14a.

As illustrated in FIG. 10, the processor 10a implements functions of a hypervisor 110a, the first virtual OS 111, the second virtual OS 112, the first app 131, and the second app 132 by reading out and executing various kinds of computer programs stored in the memory 11a. A configuration of the processor 10a may be the same as that of the processor 10 according to the first embodiment, and a configuration of the memory 11a may be the same as that of the memory 11 according to the first embodiment.

The processor 10a and the memory 11a are collectively referred to as a control unit 100a. The control unit 100a may include the hypervisor 110a, the first virtual OS 111, the second virtual OS 112, the first app 131, and the second app 132 implemented by the processor 10a and the memory 11a.

The second display control device 1b includes a processor 10b, a memory 11b, an input/output unit 12b, and a communication unit 14b. The second display control device 1b is an example of another display control device.

The processor 10b implements functions of a hypervisor 110b, a third virtual OS 113, and the third app 133 by reading out and executing various kinds of computer programs stored in the memory 11b. A configuration of the processor 10b may be the same as that of the processor 10 according to the first embodiment, and a configuration of the memory 11b may be the same as that of the memory 11 according to the first embodiment.

The processor 10b and the memory 11b are collectively referred to as a control unit 100b. The control unit 100b may include the hypervisor 110b, the third virtual OS 113, and the third app 133 implemented by the processor 10b and the memory 11b.

The first display control device 1a and the second display control device 1b share the communication antenna 13. The first display control device 1a, the second display control device 1b, the first display device 2a, and the second display device 2b are connected to each other via a bus, for example. In a case where information used for processing performed by the first virtual OS 111 or the second virtual OS 112 flows to the bus, the hypervisor 110a of the first display control device 1a acquires the information. In a case where information used for processing performed by the third virtual OS 113 executed on the second display control device 1b flows to the bus, the hypervisor 110b of the second display control device 1b acquires the information.

The first virtual OS 111 of the first display control device 1a controls execution of at least one of the first app 131 and the second app 132. In the present embodiment, the first virtual OS 111 is assumed to control the first app 131. The functions of the first app 131 and the second app 132 are the same as those in the first embodiment.

Similarly to the first embodiment, the second virtual OS 112 is an OS different from the first virtual OS 111, and controls the second app 132.

The hypervisor 110a of the first display control device 1a is executed on the processor 10a, and controls execution of the first virtual OS 111 and the second virtual OS 112. The hypervisor 110a can communicate with the hypervisor 110b of the second display control device 1b. The hypervisor 110a is an example of a first hypervisor according to the present disclosure.

The third virtual OS 113 of the second display control device 1b controls execution of the third app 133. The third virtual OS 113 is an example of a fourth operating system according to the present disclosure. The third app 133 is an example of a seventh application according to the present disclosure.

The third app 133 has the same function as that in the first embodiment. That is, the third app 133 generates the content image 30 to be displayed on the first display device 2a. The content image 30 generated by the third app 133 is an example of a fourth content image according to the present disclosure.

More specifically, the third app 133 according to the present embodiment is a duplicate of the first app 131. The third virtual OS 113 is a duplicate of the first virtual OS 111. A timing for duplication will be described later.

The hypervisor 110*b* can control execution of the third virtual OS 113, and is executed on the processor 10*b*. The hypervisor 110*b* is an example of a second hypervisor and another hypervisor according to the present disclosure.

The following describes a case where a failure has occurred in the first virtual OS 111 according to the present embodiment. In a case where a failure has occurred in the first virtual OS 111 or the second virtual OS 112, the hypervisor 110*a* performs processing for restoring the OS in which the failure has occurred. In the example illustrated in FIG. 10, a failure has occurred in the first virtual OS 111, so that the hypervisor 110*a* performs processing for restoring the first virtual OS 111. The processing for restoring the OS is, for example, to restart the OS.

In a case where the failure in the first virtual OS 111 is resolved by the processing for restoring the first virtual OS 111, the processing is performed by the first virtual OS 111 in the same manner as before occurrence of the failure.

In a case where a failure repeatedly occurs multiple times even if the processing for restoring the first virtual OS 111 is performed, the hypervisor 110*a* stops the first virtual OS 111. A condition for stopping the first virtual OS 111 is not limited thereto.

In a case where the first virtual OS 111 is stopped due to occurrence of the failure in the first virtual OS 111, the hypervisor 110*a* transfers definition information of the first virtual OS 111 and the first app 131 to the hypervisor 110*b* included in the second display control device 1*b*, and causes the hypervisor 110*b* to duplicate the first virtual OS 111 and the first app 131.

The hypervisor 110*b* duplicates the first virtual OS 111 to generate the third virtual OS 113, and duplicates the first app 131 to generate the third app 133. A method of duplicating the first virtual OS 111 and the first app 131 is not particularly limited. For example, a known method of generating a clone of the virtual OS, or a known method of live migration can be employed.

When the third virtual OS 113 and the third app 133 generated by the hypervisor 110*b* start the processing, the third virtual OS 113 can control the first display device 2*a* that has been controlled by the first virtual OS 111 before occurrence of the failure. Due to this, a path along which the content image 30 is transmitted to the first display device 2*a* is changed from a transmission path R11 for the content image 30 in a case where the first virtual OS 111 is normally operating to the transmission path R12.

In the description about FIG. 10, the failure has occurred in the first virtual OS 111. Also in a case where a failure has occurred in the second virtual OS 112, the hypervisors 110*a* and 110*b* may duplicate the second virtual OS 112 and the second app 132 by using the method described above. In a case where the second virtual OS 112 and the second app 132 are duplicated on the second display control device 1*b*, the second virtual OS 112 after being duplicated is also an example of the fourth operating system according to the present disclosure. The second app 132 after being duplicated is an example of an eighth application according to the present disclosure. The content image 30 generated by the second app 132 after being duplicated is an example of a fifth content image according to the present disclosure, and displayed on the second display device 2*b*.

The virtual OS duplicated from the first virtual OS 111 or the second virtual OS 112, that is, the fourth operating system according to the present disclosure is assumed to be able to control execution of at least one of the third app 133 and the second app 132 after being duplicated.

The second display control device 1*b* is not necessarily a device dedicated to display control. For example, the second display control device 1*b* performs other control processing in a normal state, and is substituted for performing processing of controlling the first display device 2*a* or the second display device 2*b* in a case where a failure has occurred in the first display control device 1*a*.

Figure 11:
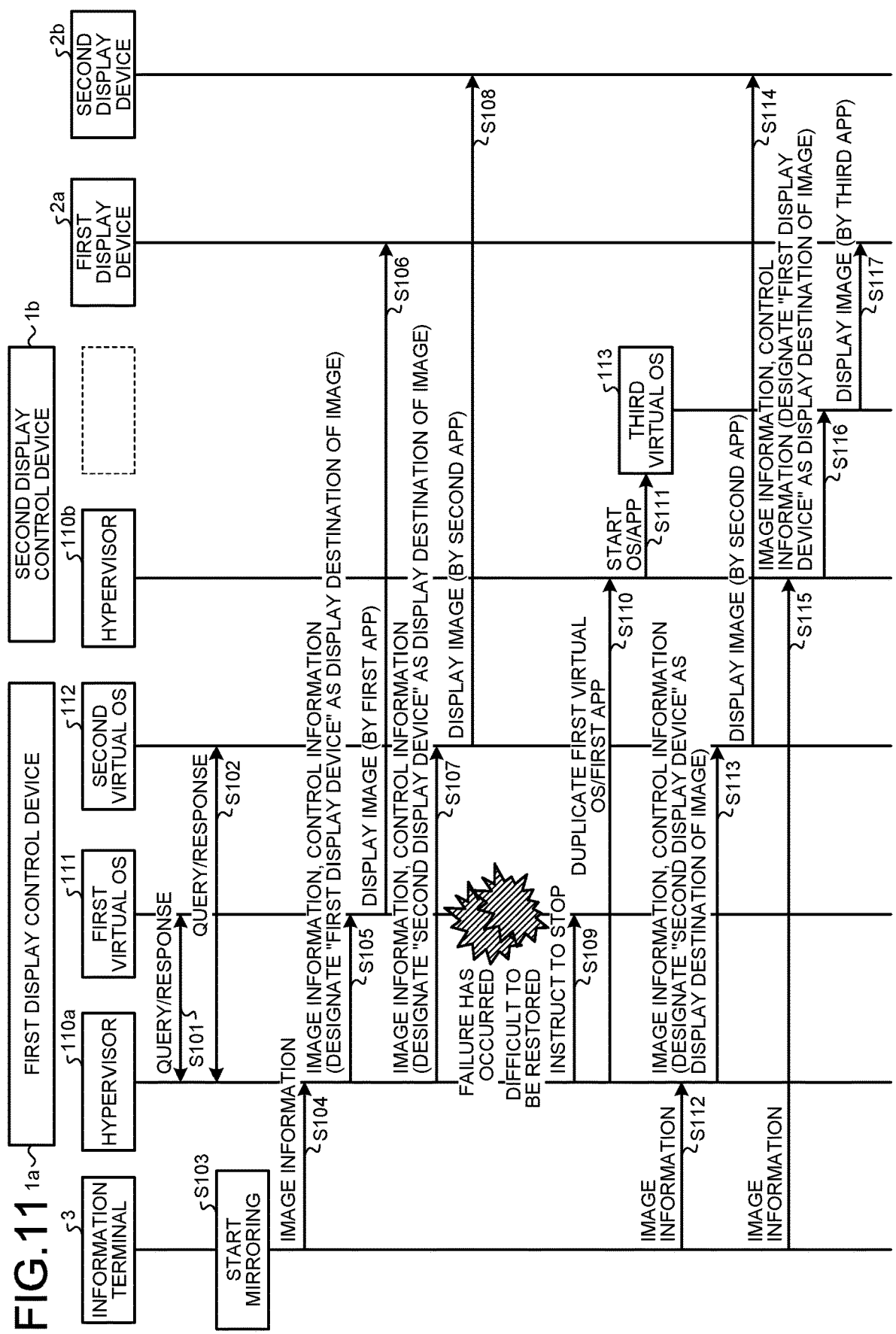
FIG. 11 is a diagram illustrating an example of a processing procedure at the time when a failure occurs in the display control system according to the second embodiment.

FIG. 11 is a diagram illustrating an example of processing procedure at the time when a failure has occurred in the display control system S according to the present embodiment. In a sequence diagram of FIG. 11, it is assumed that a failure has not occurred at the time when processing is started. At the time when the processing is started as illustrated in the sequence diagram of FIG. 11, the third virtual OS 113 and the third app 133 are not generated in the second display control device 1*b*.

The processing of the query and the response at S101 to the processing of causing the content image 30 to be displayed at S108 are the same as the pieces of processing at S1 to S8 in the first embodiment described with reference to FIG. 5.

It is assumed here that a failure has occurred in the first virtual OS 111. In this case, there is no response to the transmitted query from the first virtual OS 111, so that the hypervisor 110*a* detects that the failure has occurred in the first virtual OS 111. In a case where a failure repeatedly occurs multiple times even if the processing for restoring the first virtual OS 111 is performed, the hypervisor 110*a* determines that the first virtual OS 111 is difficult to be restored. In this case, the hypervisor 110*a* gives a stop instruction to the first virtual OS 111 (S109). At this point, the first virtual OS 111 stops.

The hypervisor 110*a* then transfers the definition information of the first virtual OS 111 and the first app 131 to the hypervisor 110*b*, and causes the hypervisor 110*b* to duplicate the first virtual OS 111 and the first app 131 (S110). The hypervisor 110*b* duplicates the first virtual OS 111 to generate the third virtual OS 113, and duplicates the first app 131 to generate the third app 133.

Next, the hypervisor 110*b* starts the third virtual OS 113 and the third app 133 (S111).

At this point, the information terminal 3 transmits the image information to the first display control device 1*a* (S112). The hypervisor 110*a* of the first display control device 1*a* receives the image information transmitted from the information terminal 3.

In this case, the hypervisor 110*a* transmits the received image information and the control information to the second virtual OS 112 (S113). In this case, the control information includes a control command for designating the second display device 2*b* as the display destination of the content image 30 based on the image information.

It is assumed here that the second virtual OS 112 is not affected by the failure occurred in the first virtual OS 111, and is normally operating. In this case, the second app 132 operating on the second virtual OS 112 generates the content image 30 on the basis of the image information acquired from the hypervisor 110*a*. The second virtual OS 112 then causes the second touch screen 21*b* of the second display device 2*b* to display the generated content image 30, the second touch screen 21*b* being the display destination designated by the control information acquired from the hypervisor 110*a* (S114).

The information terminal 3 transmits the image information to the second display control device 1*b* (S115). In FIG. 11, for convenience of explanation, pieces of processing at S112 and S115 are separated from each other, but these pieces of processing may be one piece of processing. For example, the information terminal 3 may transmit the image information without designating whether the destination is the first display control device 1*a* or the second display control device 1*b*, and the hypervisor 110*b* of the second display control device 1*b* may acquire the image information in a case where the image information flows to the bus after the third virtual OS 113 and the third app 133 are started.

The hypervisor 110*b* transmits the received image information and the control information to the third virtual OS 113 (S116). In this case, the control information includes a control command for designating the first display device 2*a* as a display destination of the content image 30 based on the image information.

The third app 133 operating on the third virtual OS 113 generates the content image 30 on the basis of the image information acquired from the hypervisor 110*b*. The third virtual OS then causes the first touch screen 21*a* of the first display device 2*a* to display the generated content image 30, the first touch screen 21*a* being the display destination designated by the control information acquired from the hypervisor 110*b* (S117).

In this way, in a case where a failure has occurred in the first virtual OS 111, the hypervisor 110*a* of the first display control device 1*a* according to the present embodiment transfers the definition information of the first virtual OS 111 and the first app 131 to the hypervisor 110*b* included in the second display control device 1*b*, and causes the hypervisor 110*b* to duplicate the first virtual OS 111 and the first app 131. In a case where the image information indicating the content image 30 is received from the information terminal 3 present in the vehicle 4, the duplicated first app 131, that is, the third app 133 according to the present embodiment generates the content image 30 on the basis of the image information. Due to this, even in a case where a failure has occurred in the first virtual OS 111, the first display control device 1*a* according to the present embodiment can cause the other display control device 1 to continue the processing of generating the content image 30 to be displayed on the first touch screen 21*a* of the first display device 2*a*. Due to this configuration, the first display control device 1*a* according to the present embodiment can improve robustness of the display control system S while exhibiting the effect of the first embodiment.

In a case where a failure has occurred in the first virtual OS 111 or the second virtual OS 112, the hypervisor 110*a* of the first display control device 1*a* according to the present embodiment performs processing for restoring the OS in which the failure has occurred. Due to this, the first display control device 1*a* according to the present embodiment can automatically perform the processing for restoration from the failure, and can enhance possibility of being quickly restored from the failure.

The display control system S according to the present embodiment includes the first display control device 1*a* and the second display control device 1*b*. The first display control device 1*a* includes the first virtual OS 111 that controls execution of at least one of the first app 131 that generates the content image 30 to be displayed on the first touch screen 21*a* of the first display device 2*a* mounted on the vehicle 4 and the second app 132 that generates the content image 30 to be displayed on the second touch screen 21*b* of the second display device 2*b* mounted on the vehicle 4, the second virtual OS 112 different from the first virtual OS 111, and the hypervisor 110*a* that is executed on the processor 10*a* to control execution of the first virtual OS 111 and the second virtual OS 112. The second display control device 1*b* includes the third virtual OS 113 that can control execution of at least one of the third app 133 that generates the content image 30 to be displayed on the first display device 2*a* and the other app that generates the content image 30 to be displayed on the second display device 2*b*, and the hypervisor 110*b* that can control execution of the third virtual OS 113 and is executed on the processor 10*b*. The display control system S according to the present embodiment includes the two display control devices 1 as described above, so that alternative processing for the processing affected by the failure can be dynamically performed in response to occurrence of the failure.

Third Embodiment

In the first and the second embodiments described above, even in a case where any of the touch screens 21 is operated, the display control device 1 does not exclude but accepts an operation from the other touch screen 21. However, in this third embodiment, in a case where the touch operation is performed on two or more points on any of the touch screens 21, the display control device 1 performs exclusive control for the other touch screen 21.

The entire configuration of the display control system S according to the present embodiment is the same as the configuration in the first embodiment described with reference to FIG. 1. The hardware configurations of the display control device 1, the first display device 2*a*, and the second display device 2*b* are the same as the configurations in the first embodiment described with reference to FIG. 2.

Figure 12:
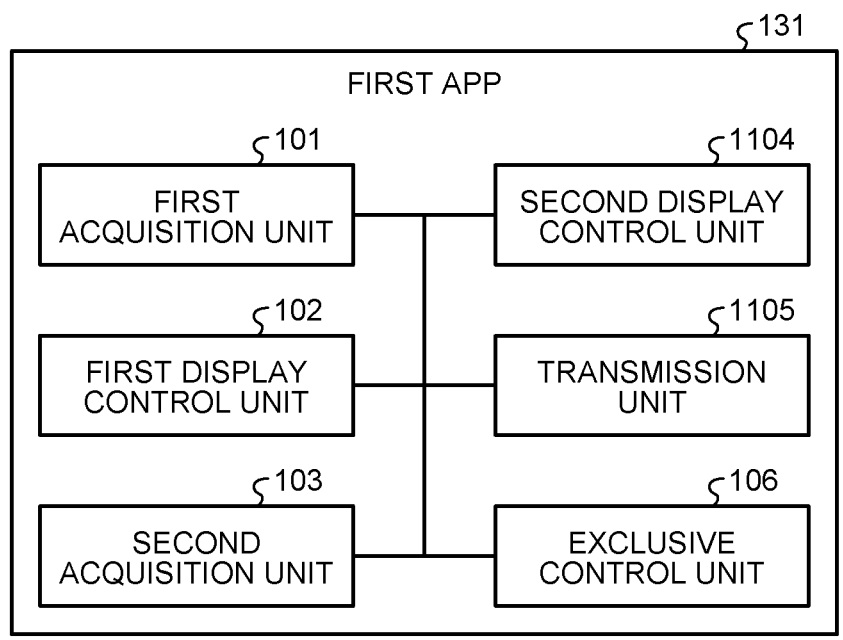
FIG. 12 is a block diagram illustrating an example of functions of a display control device according to a third embodiment.

FIG. 12 is a block diagram illustrating an example of the functions of the first app 131 according to the present embodiment. As illustrated in FIG. 12, the first app 131 according to the present embodiment includes the first acquisition unit 101, the first display control unit 102, the second acquisition unit 103, a second display control unit 1104, a transmission unit 1105, and an exclusive control unit 106. Similarly, the second app 132 includes the first acquisition unit 101, the first display control unit 102, the second acquisition unit 103, the second display control unit 1104, the transmission unit 1105, and the exclusive control unit 106.

By way of example, the first acquisition unit 101, the first display control unit 102, the second acquisition unit 103, the second display control unit 1104, the transmission unit 1105, and the exclusive control unit 106 are stored in the memory 11 as a computer-executable program. The processor 10 implements the functions corresponding to the respective units described above by reading out, from the memory 11, and executing the computer program. All of the first display control unit 102, the second acquisition unit 103, the second display control unit 1104, the transmission unit 1105, and the exclusive control unit 106 may be configured as an integrated computer program.

The first acquisition unit 101, the first display control unit 102, and the second acquisition unit 103 have the same functions as those in the first embodiment.

In a case where the touch operation is performed at two or more points in a range in which the content image 30 is displayed on any of the touch screens 21 (that is, in a case where a finger or an object is brought into contact with two or more points), the exclusive control unit 106 does not accept an operation for the other touch screen 21.

More specifically, the exclusive control unit 106 counts the points at which the touch operation is performed in the range in which the content image 30 is displayed on each of the touch screens 21, and determines whether the touch operation is performed on two or more points on one of the touch screens 21. In response to determining that the touch operation is performed at two or more points on any of the touch screens 21, the exclusive control unit 106 sends out, to the transmission unit 1105, an instruction to stop transmission of touch coordinates indicating the touch position P on the touch screen 21 other than the former touch screen 21 to the information terminal 3. In the present embodiment, this instruction is referred to as an instruction for exclusive control.

In response to determining that the touch operation is performed at two or more points on any of the touch screens 21, the exclusive control unit 106 sends out, to the transmission unit 1105, an instruction to display a message notifying that the touch screen 21 is being operated on the touch screen 21 other than the former touch screen 21. Details about the message will be described later.

In this way, in a case where the touch operation is performed at two or more points in the range in which the content image 30 is displayed on the first touch screen 21*a*, the exclusive control unit 106 does not accept an operation for the second touch screen 21*b*. In a case where the touch operation is performed at two or more points in the range in which the content image 30 is displayed on the second touch screen 21*b*, the exclusive control unit 106 does not accept an operation for the first touch screen 21*a*.

In addition to the same function as that in the first embodiment, in a case where the touch operation is performed at two or more points in a range in which the content image 30 is displayed on any of the touch screens 21, that is, in a case where the exclusive control unit 106 performs exclusive control for an operation on the other touch screen 21, the second display control unit 1104 according to the present embodiment displays the message notifying that the touch screen 21 is being operated on the other touch screen 21.

Specifically, in a case where the touch operation is performed at two or more points in a range in which the content image 30 is displayed on the first touch screen 21*a*, the second display control unit 1104 according to the present embodiment displays the message notifying that the first touch screen 21*a* is being operated on the second touch screen 21*b*. Additionally, in a case where the touch operation is performed at two or more points in a range in which the content image 30 is displayed on the second touch screen 21*b*, the second display control unit 1104 displays the message notifying that the second touch screen 21*b* is being operated on the first touch screen 21*a*.

Figure 13:
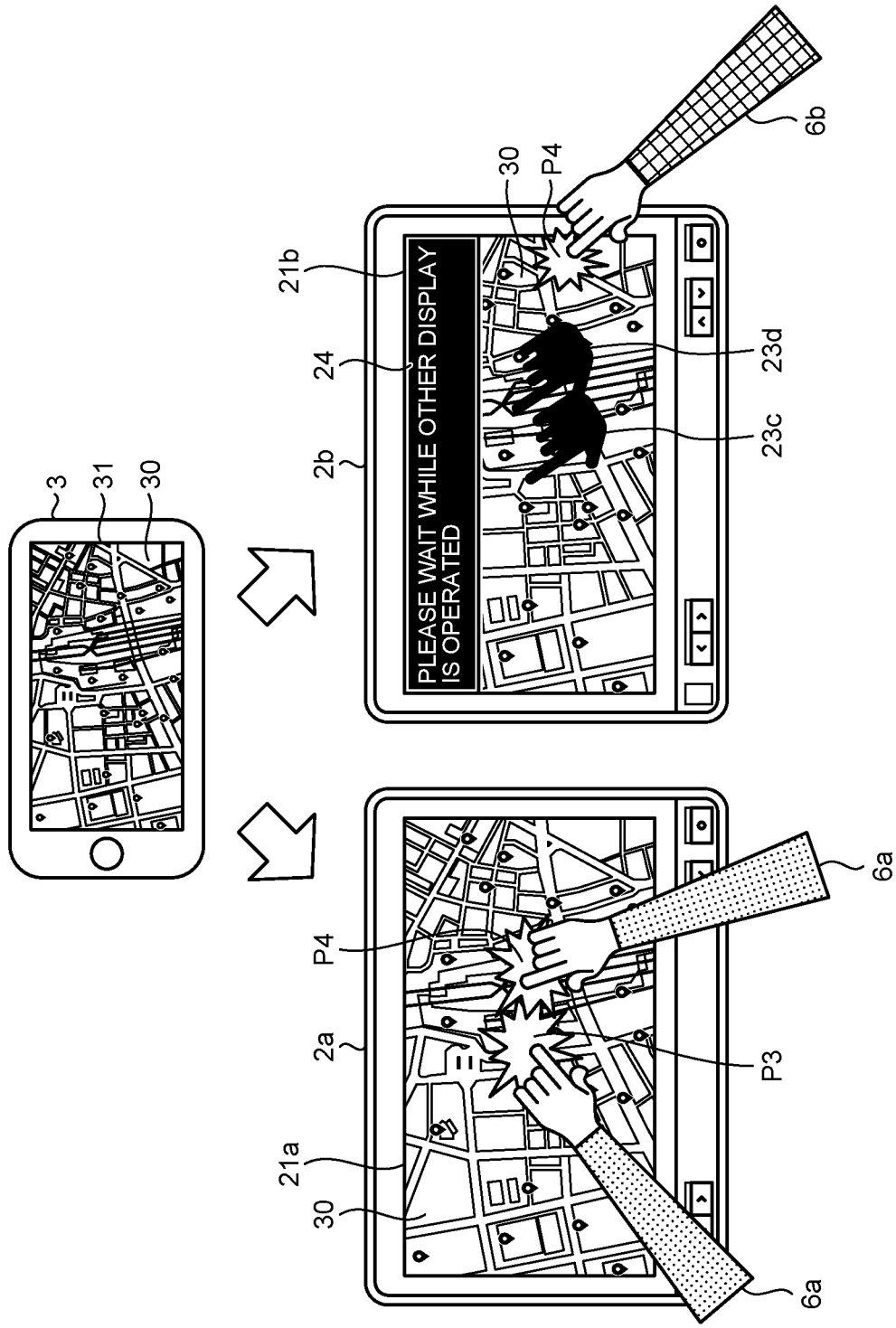
FIG. 13 is a diagram illustrating an example of screen display according to the third embodiment.

FIG. 13 is a diagram illustrating an example of screen display according to the present embodiment. In the example illustrated in FIG. 13, the user 6*a* is performing the touch operation at a touch position P3 and a touch position P4 on the first touch screen 21*a*. In this case, the second display control unit 1104 generates an image including shadow images 23*c* and 23*d*, and a message 24. The first virtual OS 111 then controls the second display device 2*b* to cause the image to be displayed on the second touch screen 21*b*. The shadow images 23*c* and 23*d* are assumed to be displayed at positions corresponding to touch coordinates of the touch position P3 and the touch position P4, respectively.

The message 24 is a message notifying that the first touch screen 21*a* is being operated. In FIG. 13, by way of example, the message of "Please wait while the other display is operated" is displayed, but wording of the message 24 is not limited thereto. Returning to FIG. 12, in addition to the same function as that in the first embodiment, in a case where the touch operation is performed at two or more points in a range in which the content image 30 is displayed on any of the touch screens 21, that is, in a case where the exclusive control unit 106 performs exclusive control for the operation on the other touch screen 21, the transmission unit 1105 according to the present embodiment stops transmission of the touch coordinates indicating the touch position P on the touch screen 21 other than the former touch screen 21 to the information terminal 3.

In the example illustrated in FIG. 13, the user 6*b* performs the touch operation at the touch position P4 on the second touch screen 21*b*, but the transmission unit 1105 does not transmit the touch coordinates indicating the touch position P4 to the information terminal 3. Thus, exclusive control is performed for the operation on the second touch screen 21*b* by the user 6*b*. In the example illustrated in FIG. 13, the display control device 1 displays the shadow images 23*c* and 23*d* and the message 24 on the second touch screen 21*b*, but may display only the message 24 on the second touch screen 21*b*.

Next, the following describes a procedure of display control processing performed by the display control system S according to the present embodiment that is configured as described above.

Figure 14:
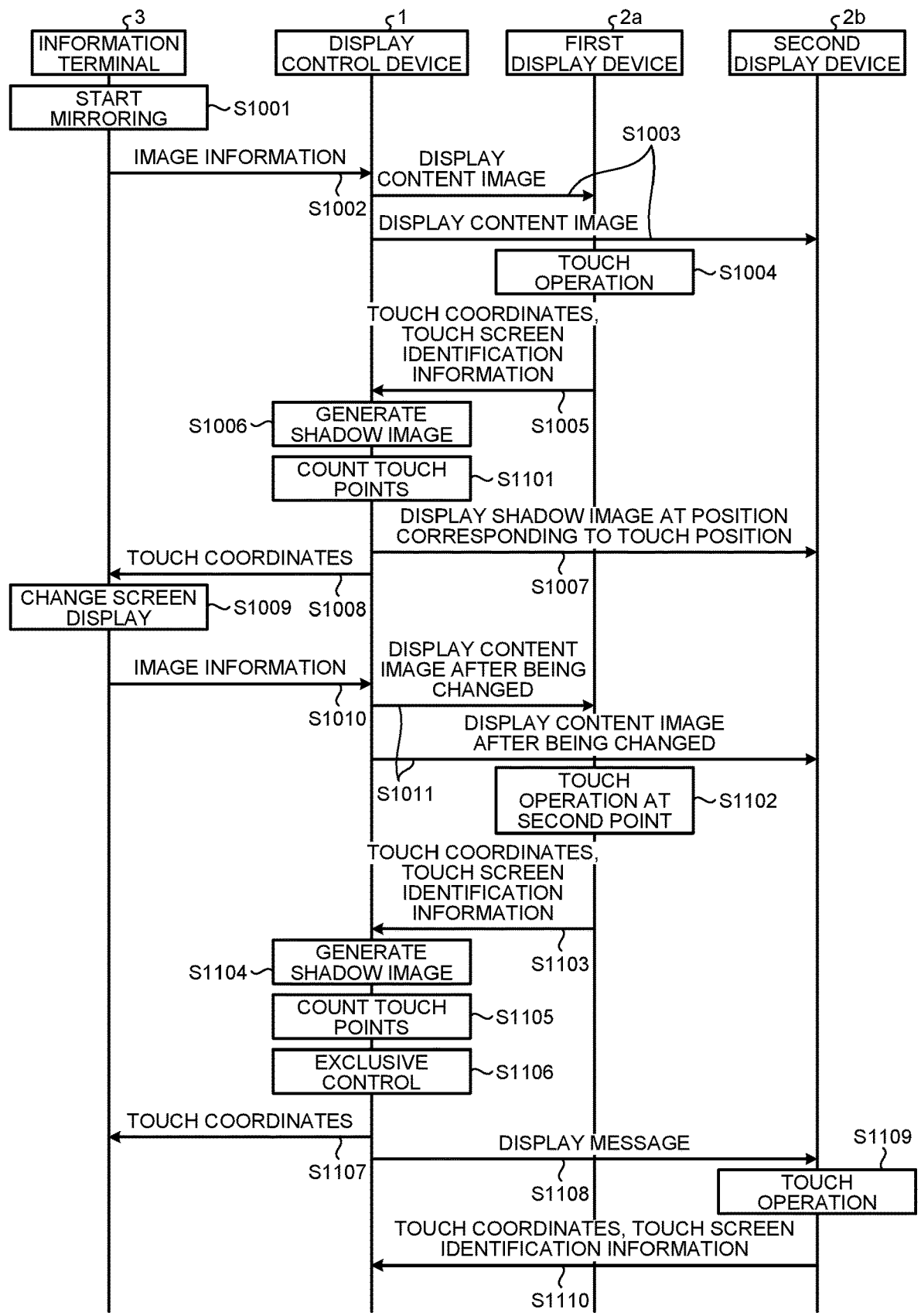
FIG. 14 is a sequence diagram illustrating an example of a procedure for display control processing performed by a display control system according to the third embodiment.

FIG. 14 is a sequence diagram illustrating an example of the procedure for display control processing performed by the display control system S according to the present embodiment. The processing of starting mirroring at 51001 to the processing of generating the shadow image 23 at S1006 are the same as the pieces of processing in the first embodiment described with reference to FIG. 8. In the touch operation at S1004, the touch operation is assumed to be performed at the touch position P3 illustrated in FIG. 13.

The exclusive control unit 106 of the display control device 1 according to the present embodiment counts the number of touch points (contact points) on the first touch screen 21*a* by counting the number of touch coordinates transmitted from the first display device 2*a* (S1101). At S1101, the touch point on the first touch screen 21*a* is only one, so that the exclusive control unit 106 does not perform exclusive control.

The processing of displaying the shadow image 23 (for example, the shadow image 23*c* illustrated in FIG. 13) at S1007 to the processing of displaying the content image 30 after being changed at S1011 are the same as the pieces of processing in the first embodiment.

Next, in a case where the touch operation is performed at the second point in the range in which the content image 30 is displayed on the first touch screen 21*a* of the first display device 2*a* (S1102), the first display device 2*a* transmits, to the display control device 1, the touch coordinates indicating the touch position P on the content image 30 (for example, the touch position P4 illustrated in FIG. 13) and touch screen identification information indicating the first touch screen 21*a* (S1103). The second acquisition unit 103 of the display control device 1 receives the touch coordinates and the touch screen identification information transmitted from the first display device 2*a*. The second acquisition unit 103 associates the received touch coordinates with the touch screen identification information to be sent out to the exclusive control unit 106, the second display control unit 1104, and the transmission unit 1105.

The processing of generating the shadow image at S1104 is the same as the processing at S1006. The exclusive control unit 106 then counts the number of touch points on the first touch screen 21*a* by counting the number of the touch coordinates transmitted from the first display device 2*a* (S1105). At this point, the touch coordinates indicating the two touch positions P3 and P4 on the first touch screen 21*a* are transmitted from the first display device 2*a*, so that the exclusive control unit 106 determines that the touch operation is performed at two or more points on the first touch screen 21*a*. In this case, the exclusive control unit 106 starts exclusive control for the second touch screen 21*b* (S1106).

Additionally, in this case, the operation for the first touch screen 21*a* is not restricted, so that the processing of transmitting the touch coordinates on the first touch screen 21*a* to the information terminal 3 at S1107 is performed similarly to S1008.

Next, the first virtual OS 111 controls the second display device 2*b* to cause the shadow image 23*d* and the message 24 to be displayed on the second touch screen 21*b* (S1108).

It is assumed here that the user 6*b* performs the touch operation at the touch position P4 in a range in which the content image 30 is displayed on the second touch screen 21*b* (S1109). In this case, the second display device 2*b* transmits, to the display control device 1, the touch coordinates indicating the touch position P4 and the touch screen identification information indicating the second touch screen 21*b* (S1110). However, exclusive control is performed by the exclusive control unit 106, so that the touch coordinates are not transmitted to the information terminal 3. The exclusive control performed by the exclusive control unit 106 ends in a case where the number of the touch points on the first touch screen 21*a* becomes equal to or smaller than 1, for example.

FIG. 14 exemplifies a case where the touch operation is performed at two or more points on the first touch screen 21*a*, but in a case where the touch operation is performed at two or more points on the second touch screen 21*b*, exclusive control is assumed to be performed for the first touch screen 21*a*. FIG. 14 exemplifies a case where the touch operation is performed at two or more points on the first touch screen 21*a*, but exclusive control may be assumed to be performed for the second touch screen 21*b* in a case where the touch operation is performed at only one point on the first touch screen 21*a*.

In this way, in a case where the touch operation is performed at two or more points in a range in which the content image 30 is displayed on the first touch screen 21*a*, the display control device 1 according to the present embodiment performs exclusive control for the operation on the second touch screen 21*b*, and displays the message 24 notifying that the first touch screen 21*a* is being operated on the second touch screen 21*b*. Due to this, in a case where the user 6 performs an operation of touching two or more points such as a pinch-in or pinch-out operation on any of the touch screens 21, the display control device 1 according to the present embodiment prevents an operation unintended by the user 6 from being performed due to influence of an operation performed by the other user on the other touch screen 21. By displaying the message 24, the display control device 1 according to the present embodiment prevents the other user who is using the other touch screen 21 for which exclusive control is performed from misunderstanding that the reason why the touch operation is not accepted is a failure in the other touch screen 21.

The present embodiment describes the example in which an exclusive control function is added to the display control device 1 according to the first embodiment, but the exclusive control function may be added to the first display control device 1*a* and the second display control device 1*b* according to the second embodiment.

First Modification

The above embodiments describe the hypervisor 110 of a native type that manages each of the virtual OSs, but the type of the hypervisor 110 is not limited thereto.

For example, the display control device 1 may include a management OS that manages the other virtual OS. The management OS is a virtual OS that operates under the control of the hypervisor 110, and also referred to as a management guest OS.

In a case of this configuration, the management OS controls execution of a failure detection app that detects occurrence of a failure related to at least one of the first virtual OS 111 and the second virtual OS 112.

In a case where occurrence of a failure related to at least one of the first virtual OS 111 and the second virtual OS 112 is detected, the failure detection app performs processing for restoring the first virtual OS 111 or the second virtual OS 112 in which occurrence of the failure is detected for the first virtual OS 111 or the second virtual OS 112 in which occurrence of the failure is detected.

The management OS is an example of a third operating system according to the present disclosure. The failure detection app is an example of a fourth application according to the present disclosure.

With the display control device 1 according to the present modification, the processing of detecting a failure in the first virtual OS 111 or the second virtual OS 112 can be performed with a format appropriate for a virtualization format in which the hypervisor 110 controls the management OS.

Second Modification

The hypervisor 110 does not necessarily control the management OS, but the management OS may be provided in a hierarchy that is parallel with the hypervisor 110. For example, a configuration in which the management OS and the hypervisor 110 respectively operate on the processor 10 may be employed.

Third Modification

In place of the virtual OS operating on the hypervisor 110, a native application operating on the processor 10 may manage each of the virtual OSs as the failure detection app. For example, a configuration in which the native application and the hypervisor 110 respectively operate on a host OS operating on the processor 10 may be employed.

Fourth Modification

A configuration in which the virtual OSs, in place of the hypervisor 110, monitor occurrence of a failure each other may be employed. For example, the first virtual OS 111 further controls execution of a first failure detection app that detects occurrence of a failure related to the second virtual OS 112. The second virtual OS 112 further controls execution of a second failure detection app that detects occurrence of a failure related to the first virtual OS 111.

The first failure detection app is an example of a fifth application according to the present disclosure. The second failure detection app is an example of a sixth application according to the present disclosure.

In a case where occurrence of a failure related to the second virtual OS 112 is detected, the first failure detection app performs processing for restoring the second virtual OS 112 for the second virtual OS 112. In a case where occurrence of a failure related to the first virtual OS 111 is detected, the second failure detection app performs processing for restoring the first virtual OS 111 for the first virtual OS 111.

In a case of employing such a configuration, the OS takes over part of the processing performed by the hypervisor 110, so that a processing load on the hypervisor 110 can be reduced.

Fifth Modification

A configuration in which the first virtual OS 111 controls execution of both of the first app 131 and the second app 132 may be employed.

For example, in a case where the image information indicating the content image 30 is received from the information terminal 3 present in the vehicle 4, the hypervisor 110 transmits, to the first virtual OS 111, image information, first control information for causing the first display device 2a to display the content image 30 based on the image information, and second control information for causing the second display device 2b to display the content image 30 based on the image information.

In this case, the first app 131 generates the content image 30 to be displayed on the first touch screen 21a of the first display device 2a on the basis of the image information. The second app 132 generates the content image 30 to be displayed on the second touch screen 21b of the second display device 2b on the basis of the image information.

In a case of employing this configuration, the first display device 2a and the second display device 2b are respectively controlled by different apps, that is, the first app 131 and the second app 132. Therefore, in a case where a failure or the like has occurred in any of the apps, it is possible to avoid a situation in which all of the display devices 2 are affected thereby.

Sixth Modification

The above embodiments describe the example in which both of the first operating system and the second operating system are virtual OSs, but the configuration is not limited thereto. For example, at least one of the first operating system and the second operating system may be a virtual operating system. Alternatively, both of the first operating system and the second operating system are not necessarily virtual OSs.

Seventh Modification

The first virtual OS 111 and the second virtual OS 112 may be different types of virtual OSs. The types of the virtual OSs included in the display control device 1 may be different between the display devices 2 controlled by the respective virtual OSs. For example, a type of the virtual OS appropriate for controlling the first display device 2a may be different from a type of the virtual OS appropriate for controlling the second display device 2b. In such a case, the display control device 1 may include a virtual OS of a type appropriate for controlling the first display device 2a and a virtual OS of a type appropriate for controlling the second display device 2b.

Eighth Modification

The first virtual OS 111 and the second virtual OS 112 may be different from each other in robustness related to execution of processing. For example, in a case where one OS controls execution of both of the first app 131 and the second app 132 as in the fifth modification, the OS having higher robustness may control execution of these apps.

Ninth Modification

The first virtual OS 111 and the second virtual OS 112 may be different from each other in real-time performance related to execution of processing.

Tenth Modification

In the embodiments described above, the same content image 30 as the content image 30 displayed on the display 31 of the information terminal 3 is assumed to be displayed on the first display device 2a and the second display device 2b by a mirroring technique, but the content image 30 displayed on the first display device 2a and the second display device 2b is not limited thereto.

For example, the display control device 1 may cause the content image 30 to be displayed on the first display device 2a and the second display device 2b by a technique other than mirroring. In this case, the first content image displayed on the first touch screen 21a of the first display device 2a and the second content image displayed on the second touch screen 21b of the second display device 2b may be different from each other.

Eleventh Modification

In the embodiments described above, the display control system S is assumed to include the two display devices 2. However, the number of the display devices 2 is not limited thereto, but may be three or ten, for example. Installation positions of the first display device 2a and the second display device 2b are not limited to the example illustrated in FIG. 1, for example. For example, the display control system S according to the present embodiment is not necessarily mounted on the vehicle 4.

Twelfth Modification

In each of the embodiments described above, in a case where the touch operation is performed on the touch screen 21 by the user 6, the shadow image 23 is assumed to be displayed on the other touch screen 21. Alternatively, a message notifying that the touch operation is performed on the touch screen 21 may be displayed instead of the shadow image 23.

For example, in a case where the touch operation is performed on the first touch screen 21a, the second display control unit 1104 of the display control device 1 may generate a message notifying that the touch operation is performed on the first touch screen 21a. This message may also be displayed on the second touch screen 21b. In the present modification, the message is an example of an index image.

Thirteenth Modification

In each of the embodiments described above, as illustrated in FIG. 2, it is assumed that each of the display control devices 1 includes the one processor 10. However, the hardware configuration of the display control device 1 is not limited thereto. For example, the display control device 1 may include processors and may execute the pieces of processing described in the above embodiments by the processors in a distributed manner.

Fourteenth Modification

In each of the embodiments described above, the display control device 1 performs display control for the first touch screen 21a and the second touch screen 21b, and generates the shadow image 23. Alternatively, all or part of these functions may be executed by the first display device 2a and the second display device 2b.

While certain embodiments have been described, these embodiments have been presented by way of example only, and are not intended to limit the scope of the inventions. Indeed, the novel methods and systems described herein may be embodied in a variety of other forms; moreover, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display control device, comprising:
a hardware processor configured to implement functions of:
a first operating system to control execution of at least one of a first application and a second application, the first application serving to generate a first content image to be displayed on a first display device mounted on a vehicle, the second application serving to generate a second content image to be displayed on a second display device mounted on the vehicle;
a second operating system different from the first operating system; and
a hypervisor to control execution of the first operating system and the second operating system,
wherein, in a first case where first image information indicating the first content image is received from an information terminal present in the vehicle, the first application generates the first content image based on the first image information,
in a second case where second image information indicating the second content image is received from the information terminal present in the vehicle, the second application generates the second content image based on the second image information,
in a third case where a touch operation is performed by a first user in a range in which the first content image is displayed on a first touch screen included in the first display device, the first operating system receives, from the first display device, first coordinate information indicating a contact position on the first content image, and
in the third case where the first operating system receives the first coordinate information, the second application generates a third content image for notification on which an index image is superimposed at a position corresponding to the first coordinate information on the second content image displayed on a second touch screen included in the second display device.

2. The display control device according to claim 1, wherein the index image is an image indicating that the touch operation is performed in the range in which the first content image is displayed on the first touch screen.

3. The display control device according to claim 1, wherein, in a case where the first coordinate information is received from the first display device, the hypervisor transmits the received first coordinate information to the information terminal.

4. The display control device according to claim 1, wherein the hypervisor detects at least occurrence of a failure related to the first operating system.

5. The display control device according to claim 4, wherein, in a fourth case where the occurrence of the failure related to the first operating system is detected, the hypervisor performs processing for restoring the first operating system.

6. The display control device according to claim 4, wherein
the second operating system controls at least execution of a third application, the third application serving to generate the first content image to be displayed on the first display device,
in a fourth case where the occurrence of the failure related to the first operating system is detected and first image information indicating the first content image is received from an information terminal present in the vehicle, the hypervisor transmits, to the second operating system, control information for causing the first display device to display the first image information, and
the third application generates the first content image based on the first image information.

7. The display control device according to claim 1, wherein the hardware processor is further configured to implement a function of a third operating system to control execution of a fourth application, the fourth application serving to detect occurrence of a failure related to at least one of the first operating system and the second operating system.

8. The display control device according to claim 7, wherein, in a fourth case where the occurrence of the failure related to the at least one of the first operating system and the second operating system is detected, the fourth application performs, for the at least one of the first operating system and the second operating system, processing for restoring the at least one of the first operating system and the second operating system in which the occurrence of the failure is detected.

9. The display control device according to claim 1, wherein
the first operating system further controls execution of a fifth application, the fifth application serving to detect occurrence of a failure related to the second operating system, and
the second operating system further controls execution of a sixth application, the sixth application serving to detect occurrence of a failure related to the first operating system.

10. The display control device according to claim 9, wherein,
in a fourth case where the occurrence of the failure related to the second operating system is detected, the fifth application performs, for the second operating system, processing for restoring the second operating system, and,
in a fifth case where the occurrence of the failure related to the first operating system is detected, the sixth application performs, for the first operating system, processing for restoring the first operating system.

11. The display control device according to claim 1, wherein at least one of the first operating system and the second operating system is a virtual operating system.

12. The display control device according to claim 1, wherein
the first operating system controls execution of both of the first application and the second application,
in the first case where the first image information indicating the first content image is received from the information terminal present in the vehicle, the hypervisor transmits, to the first operating system, the first image information, first control information for causing the first display device to display the first content image based on the first image information, and second control information for causing the second display device to display the second content image based on the first image information.

13. The display control device according to claim 1, wherein
the first operating system controls at least execution of the first application,
the second operating system controls at least execution of the second application, in the first case where the first image information indicating the first content image is received from the information terminal present in the vehicle, the hypervisor transmits, to the first operating system, the first image information and first control information for causing the first display device to display the first content image based on the image information, and transmits, to the second operating system, the second image information and second control information for causing the second display device to display the second content image based on the second image information.

14. The display control device according to claim 13, wherein a type of the first operating system is associated with the first display device, and a type of the second operating system is associated with the second display device.

15. The display control device according to claim 13, wherein a type of the first operating system is different from a type of the second operating system.

16. The display control device according to claim 15, wherein the first operating system is different from the second operating system in robustness related to execution of processing.

17. The display control device according to claim 15, wherein the first operating system is different from the second operating system in real-time performance related to execution of processing.

18. The display control device according to claim 1, wherein the first display device is disposed at a first position that is visible to a first user seated on a rear seat of the vehicle, and the second display device is disposed at a second position that is visible to a second user seated on the rear seat of the vehicle.

19. The display control device according to claim 1, wherein the hypervisor transmits a query to the first operating system at predetermined time intervals, and determines that a failure has occurred in the first operating system in a fourth case where there is no response to the query from the first operating system.

20. The display control device according to claim 1, wherein, in a fourth case where a failure has occurred in the first operating system, the hypervisor transfers definition information of the first operating system and the first application to a second hypervisor included in a second display control device, and the hypervisor causes the second hypervisor to duplicate the first operating system and the first application, and, in a fifth case where the first image information indicating the first content image is received from the information terminal present in the vehicle, the duplicated first application generates the first content image based on the first image information.

21. A display control system, comprising:
a first display control device; and
a second display control device, wherein
the first display control device includes a first hardware processor configured to implement functions of:

a first operating system to control execution of at least one of a first application and a second application, the first application serving to generate a first content image to be displayed on a first touch screen of a first display device mounted on a vehicle, the second application serving to generate a second content image to be displayed on a second touch screen of a second display device mounted on the vehicle;

a second operating system different from the first operating system; and a first hypervisor to control execution of the first operating system and the second operating system, the second display control device includes a second hardware processor configured to implement functions of:

a fourth operating system to control execution of at least one of a seventh application and an eighth application, the seventh application serving to generate a fourth content image to be displayed on the first display device, the eighth application serving to generates a fifth content image to be displayed on the second display device; and a second hypervisor to control execution of the fourth operating system, the first hypervisor detects at least occurrence of a failure related to the first operating system, in a case where the occurrence of the failure related to the first operating system is detected and first image information indicating the first content image is received from an information terminal present in the vehicle, the first hypervisor transmits, to the fourth operating system, control information for causing the first display device to display the first image information, and the seventh application generates the first content image based on the first image information.

22. A display control device, comprising:
a hardware processor configured to implement functions of:

a first operating system to control execution of at least one of a first application and a second application, the first application serving to generate a first content image to be displayed on a first display device mounted on a vehicle, the second application serving to generate a second content image to be displayed on a second display device mounted on the vehicle;

a second operating system different from the first operating system; and a hypervisor to control execution of the first operating system and the second operating system, wherein the hypervisor detects at least occurrence of a failure related to the first operating system, the second operating system controls at least execution of a third application, the third application serving to generate the first content image to be displayed on the first display device, in a case where the occurrence of the failure related to the first operating system is detected and first image information indicating the first content image is received from an information terminal present in the vehicle, the hypervisor transmits, to the second operating system, control information for causing the first display device to display the first image information, and the third application generates the first content image based on the first image information.

23. The display control device according to claim 1, wherein the first content image if the second content image.

* * * * *